United States Patent [19]

Shinada et al.

[11] Patent Number: 5,461,601
[45] Date of Patent: Oct. 24, 1995

[54] LIGHT BEAM RECORDING DEVICE HAVING A REFLECTING MIRROR MOVABLE A LONG AN OPTICAL AXIS TO COMPENSATE AN UN-FOCUSED POINT ON THE SURFACE OF A RECORDING MEDIUM

[75] Inventors: Hidetoshi Shinada; Kiichi Kato; Katsuto Sumi, all of Kanagawa, Japan

[73] Assignee: Fuji Photo Film., Co., Kanagawa, Japan

[21] Appl. No.: 279,430

[22] Filed: Jul. 25, 1994

Related U.S. Application Data

[62] Division of Ser. No. 91,007, Jul. 14, 1993.

[30] Foreign Application Priority Data

Jul. 15, 1992 [JP] Japan .................................. 4-188407
Jul. 15, 1993 [JP] Japan .................................. 4-188408

[51] Int. Cl.⁶ ...................... G03B 27/52; G03B 27/70; G11B 7/00
[52] U.S. Cl. ...................... 369/112; 369/116; 355/55; 355/66
[58] Field of Search .................. 369/112, 116; 355/55, 66, 209, 211, 212, 221, 238, 309, 321; 250/585, 586, 584

[56] References Cited

U.S. PATENT DOCUMENTS

| | | | |
|---|---|---|---|
| 4,661,708 | 4/1987 | Agano | 250/585 |
| 4,873,435 | 10/1989 | Ono et al. | 359/221 |
| 5,072,119 | 12/1991 | Yamaguchi | 250/586 |
| 5,074,628 | 12/1991 | Khattak et al. | 359/211 |
| 5,168,386 | 12/1992 | Galbraith | 359/212 |
| 5,255,115 | 10/1993 | Kikuchi | 359/209 |

FOREIGN PATENT DOCUMENTS

| | | |
|---|---|---|
| 55-67722 | 5/1980 | Japan . |
| 3-17610 | 1/1991 | Japan . |

*Primary Examiner*—Scott J. Sugarman
*Assistant Examiner*—Kim-Kwok Chu
*Attorney, Agent, or Firm*—Sughrue, Mion, Zinn, Macpeak & Seas; Richard C. Turner; Peter A. McKenna

[57] ABSTRACT

A light beam recording device. A light beam irradiated from a light beam irradiating device is scanned onto an object to be illuminated, which is provided in a vicinity of a focal position, while being focused by a scanning optical system. A converging member is disposed on an optical path between the light beam irradiating device and the scanning optical system, and converges a light beam which is incident on the converging member. An optical path changing device is disposed in a vicinity of a converging position of a light beam which is converged by the converging member, and changes an optical path of the light beam.

4 Claims, 18 Drawing Sheets

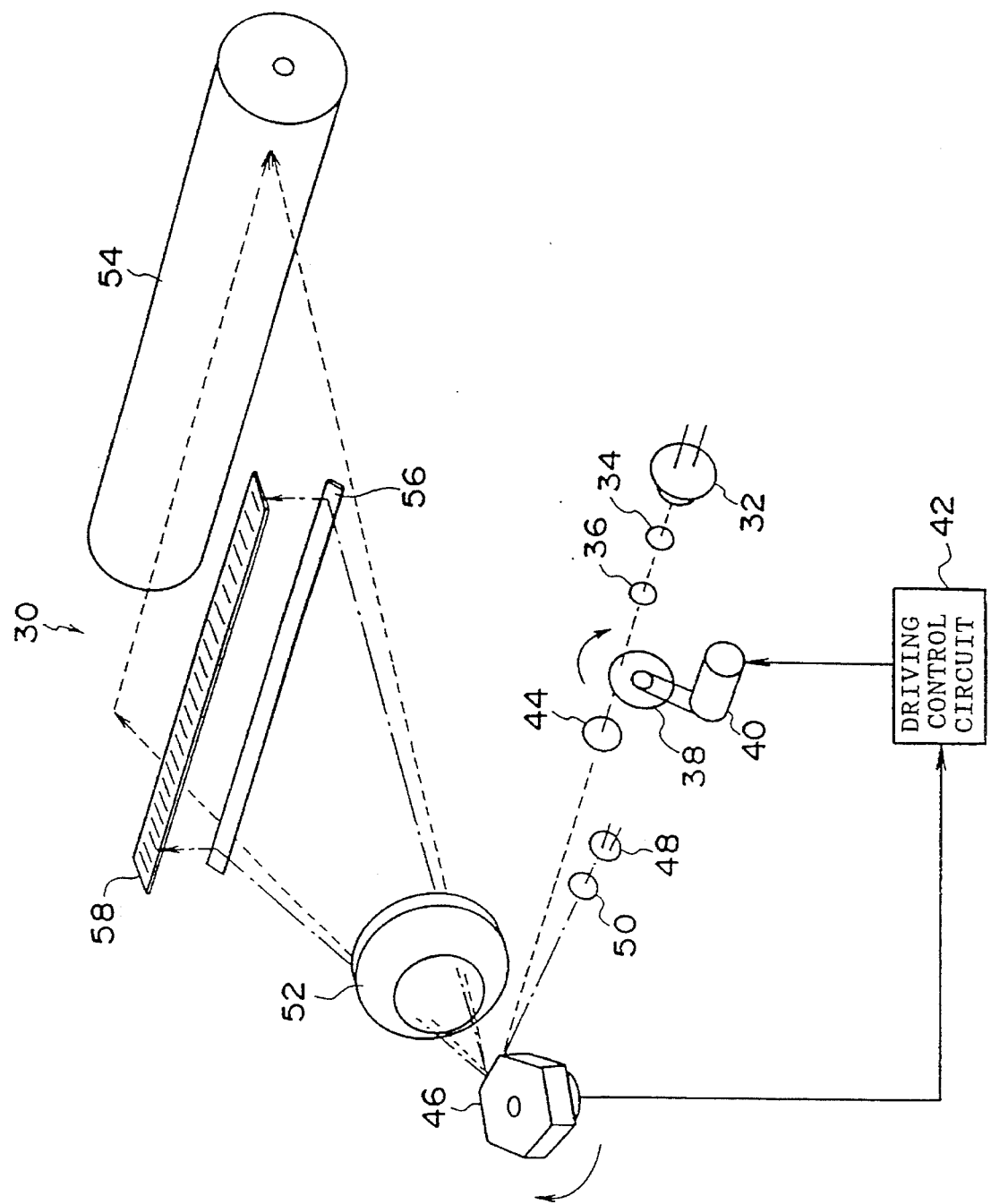

FIG. 5A
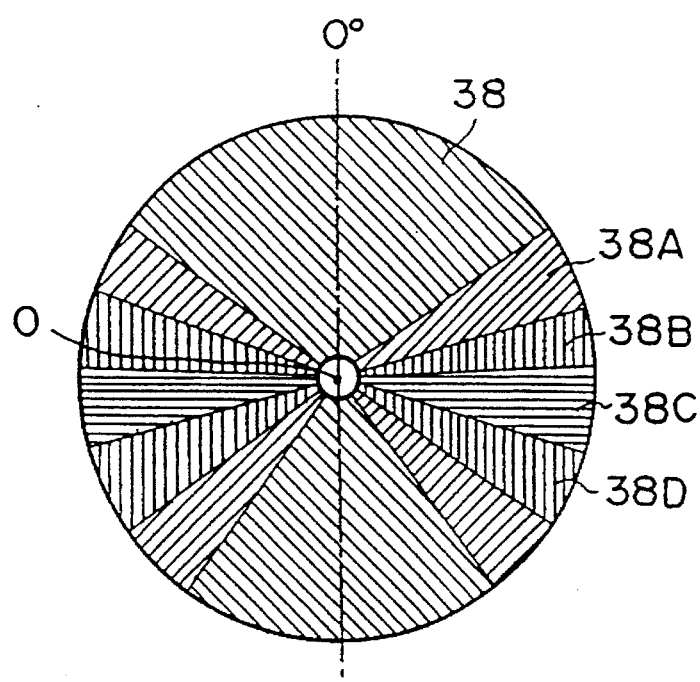
FIG. 5B
FIG. 5C
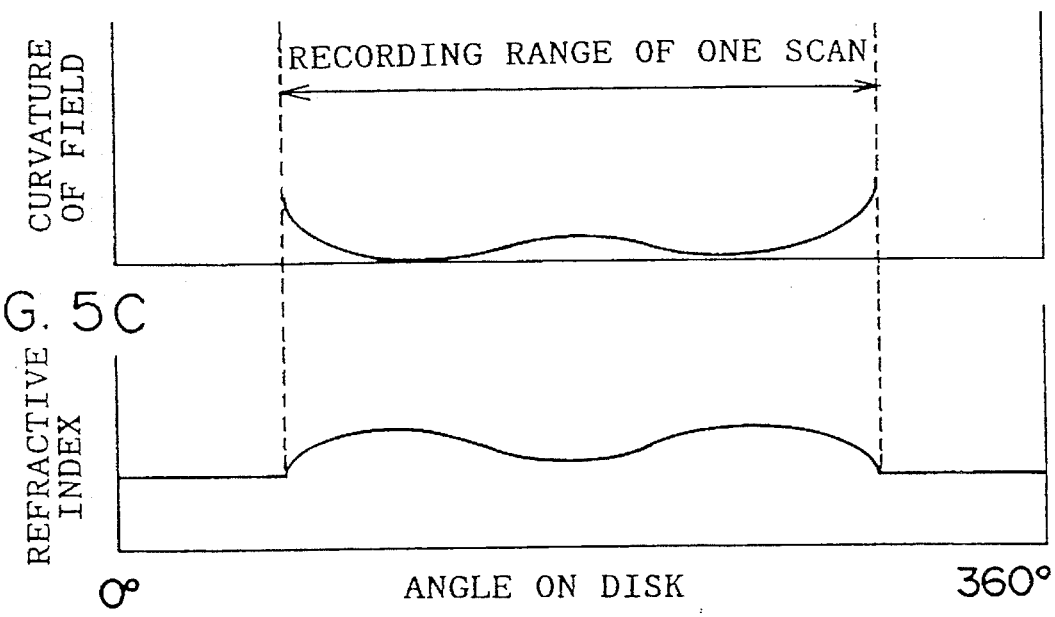

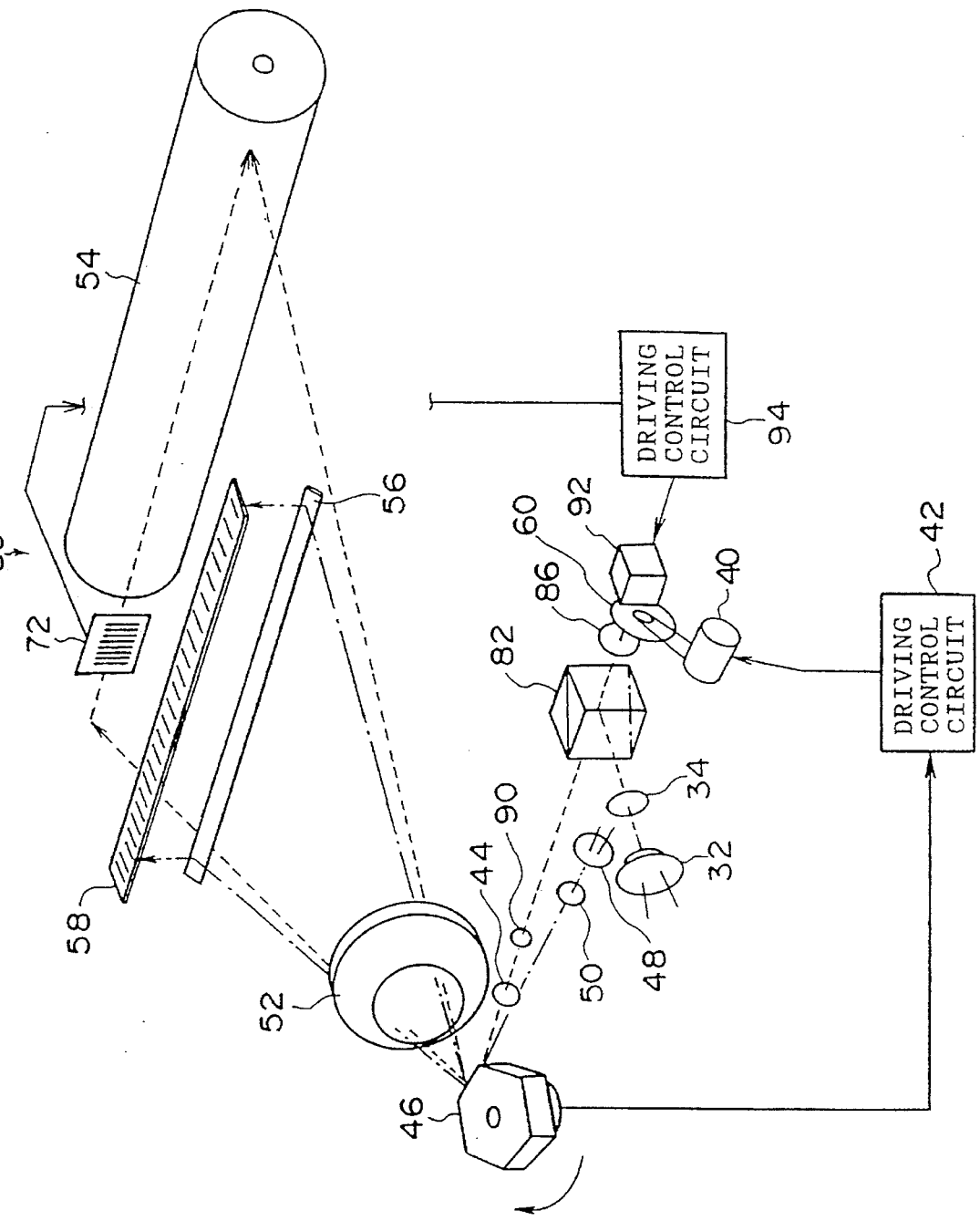

LIGHT BEAM RECORDING DEVICE HAVING A REFLECTING MIRROR MOVABLE A LONG AN OPTICAL AXIS TO COMPENSATE AN UN-FOCUSED POINT ON THE SURFACE OF A RECORDING MEDIUM

This is a divisional of application Ser. No. 08/091,007 filed Jul. 14, 1993

BACKGROUND OF THE INVENTION

1. Field of the Invention

The present invention relates to a light beam recording device and to a disk used in the light beam recording device.

2. Description of the Related Art

A laser computer output microfilmer (laser COM) is known as a device for recording characters, images or the like onto a recording material by use of a light beam (Japanese Patent Application Laid-Open No. 55-67722). In this device, a laser beam is scanned based on, for example, computer output information, so that information, such as characters, are directly recorded onto a recording material such as a microfilm. In this type of light beam recording device, the light beam is deflected by a deflecting means such as a polygon mirror or a galvanic mirror and is then imaged onto a recording surface of the recording material by a scanning lens so that information is recorded onto the recording material.

The above-described device uses an f-θ lens having an imaging relation expressed by the following formula (1). The recording material is disposed at the focal point surface (hereinafter, "image surface") of the f-θ lens.

$$s = f \cdot \tan \theta \quad (1)$$

wherein s: distance from the optical axis to the imaging point f: focal length of the f-θ lens θ: angle of incidence of the light beam with respect to the optical axis It is possible that the image surface of the light beam deflected by the deflecting means and transmitted through the f-θ lens is not planar due to the crystal inside the f-θ lens being irregular or due to other reasons. For example, as illustrated in FIG. 18, a laser beam is irradiated from a semiconductor laser 100 and is then transformed into parallel light by a collimator lens 102. After being deflected along the scanning direction (the direction of arrow C in FIG. 18) by a polygon mirror 104, the laser beam is imaged by an f-θ lens 106 onto a recording material wound on a drum 108. However, the focal position (specifically, the beam waist position) of the laser beam deviates from the recording surface due to the deflection angle, resulting in the curving of the image surface as shown by the broken line 110 in FIG. 18 (hereinafter, "curvature of field surface 110").

In FIG. 18, at portions at which the beam waist position of the laser beam deviates from the recording surface (especially in vicinities of the end portions of the curvature of field surface 110), the beam diameter of the light beam illuminated onto the recording surface is relatively large compared to the beam diameter at the beam waist position, and the energy of the light beam irradiated onto the recording surface per unit area is low. Therefore, a drawback arises in that portions of the character, image or the like recorded on the recording surface are unclear. In recent years, more demands have been made of light beam recording devices which can be applied to output devices or the like for printing and which can record even larger sized images. As the size of the recorded image increases, the image quality deteriorates due to the above-mentioned phenomenon.

In order to solve this drawback, a method has been considered in which the curvature of field surface is corrected so as to become planar by an electrooptic lens which uses a PLZT electrooptic ceramic or the like and which allows arbitrary, electric control of the beam waist position of the light beam. However, because light transmittance of the PLZT electrooptic lens is low and scattering is high, the power of the light beam cannot be utilized effectively. The PLZT electrooptic lens is therefore unsuitable for recording of large-sized images. Further, as electrooptic lenses are expensive, a drawback arises in that the cost of the light beam recording device increases.

Further, Japanese Patent Application Laid-Open No. 3-17610 discloses a scanning optical device in which a wedge-shaped prism is disposed before a deflecting means which is disposed on an optical path of a light beam. The prism is moved synchronously with the deflection of the deflecting means. When the wedge-shaped prism varies a position above the prism through which the light beam is transmitted, the optical path of the light beam can be varied, and consequently, the beam waist position of the light beam can be varied. Accordingly, if the prism is moved so that the curvature of field is corrected and the image surface becomes planar, the beam waist position of the light beam can be made to coincide with the recording surface.

However, there are few cases in which the curvature of field surface is a simple curved surface which is curved at a constant curvature of field (see FIG. 18). In order for the scanning optical device to make the image surface planar, it is necessary to reciprocally move the prism a plurality of times and in a complicated manner for each one scan of the light beam. When the light beam is scanned rapidly, the inertial force or the like of the prism is effected, and the prism cannot be moved accurately.

Therefore, it is difficult to record the image or the like at high speed. Further, even if the movement of the prism can follow the scanning speed of the light beam, the vertical angle of the light beam varies along with the movement of the wedge-shaped prism. Therefore, a drawback arises in that the intervals between pixels vary, resulting in distortion of the image.

SUMMARY OF THE INVENTION

In view of the aforementioned, an object of the present invention is to provide a disk for a light beam recording device and a light beam recording device in which rapid, high-quality recording of images and the like can be effected.

Another object of the present invention is to provide a light beam recording device in which a light beam can be correctly focussed on an object to be illuminated without the quality of the image deteriorating due to deviation of the focal position resulting from aberration or the like of a scanning optical system.

A first aspect of the present invention is a disk for a light beam recording device including: a disk main body provided so as to be rotatable around a substantial center of the disk main body: and optical path changing means provided on the disk main body and changing an optical path of a light beam transmitted through the disk main body, the optical path changing means being provided along a direction of rotation of the disk main body so as to effect a predetermined distribution to change the optical path of the light beam along the direction of rotation of the disc main body.

Further, it is preferable that the optical path changing means is provided with a plurality of optical path changing portions disposed coaxially and having different rates of changing the optical path in a radial direction of the disk main body.

A second aspect of the present invention is a light beam recording device including: light beam irradiating means for irradiating a light beam; deflecting means for deflecting the light beam-irradiated from the light beam irradiating means; a scanning lens for imaging the light beam, which was deflected by the deflecting means, onto an object to be illuminated; converging means disposed on an optical path between the light beam irradiating means and the deflecting means, and converging the light beam which is incident on the converging means; a disk provided rotatably in a vicinity of a converging position and having optical path changing portions which are provided along a direction of rotation of the disk so as to effect a predetermined distribution, the optical path changing portions changing the optical path of the light beam transmitted through the disk so that an image surface which is imaged by the deflecting means and the scanning lens becomes substantially planar; and driving means for rotating and driving the disk synchronously with the deflection of the deflecting means.

Further, it is preferable that the optical path changing means has driving means for rotating and driving the disk synchronously with a scanning of the scanning optical system.

A third aspect of the present invention is a light beam recording device including: light beam irradiating means for irradiating a light beam; a scanning optical system having a scanning lens which scans the light beam onto an object to be illuminated while focussing the light beam; a converging means disposed on an optical path between the light beam irradiating means and the scanning lens and converging the light beam which is incident on the converging means; an optical axis direction moving member having a reflecting surface which is disposed in a vicinity of a converging position of the light beam converged by the converging means, the reflecting surface being movable in directions of an optical axis and changing the optical path by moving; and control means for controlling the optical axis direction moving member so that a focal position of the light beam illuminated from the scanning optical system in a direction of the object to be illuminated coincides with a position of the object to be illuminated.

A fourth aspect of the present invention is a light beam recording device including: light beam irradiating means for irradiating a light beam; a scanning optical system having a scanning lens, and scanning the light beam onto an object to be illuminated while focussing the light beam; first converging means disposed on an optical path between the light beam irradiating means and the scanning lens, and converging, in a direction intersecting an optical axis, a light beam incident on the first converging means; second converging means disposed on the optical path between the light beam irradiating means and the scanning lens, and converging, in a direction intersecting a direction in which the first converging means converges, a light beam incident on the second converging means; first optical path changing means having a first reflecting surface which reflects light converged by the first converging means, the first reflecting surface being disposed in a vicinity of a converging position of a light beam converged by the first converging means, and the first reflecting surface being provided movably in directions of the optical axis such that the optical path is changed by movement of the first reflecting surface; second optical path changing means a second reflecting surface which reflects light converged by the second converging means, the second reflecting surface being disposed in a vicinity of a converging position of a light beam converged by the second converging means, and the second reflecting surface being provided movably in directions of the optical axis such that the optical path is changed by movement of the second reflecting surface; and control means controlling the first optical path changing means and the second optical path changing means so that a position at which a light beam, which is illuminated from the scanning optical system in a direction of the object to be illuminated, is focussed coincides with a position of the object to be illuminated.

In a fifth aspect of the present invention, the optical axis direction moving member is a piezo-electric element in which the reflecting surface is formed by a deposited surface.

In a sixth aspect of the present invention, the scanning optical system is provided so that magnification in a scanning direction is greater than or equal to a predetermined value.

In accordance with the first aspect of the present invention having the above-described structure, the disk is rotatable and is provided with the optical path changing portions which change the optical path of the light beam transmitted through the disk by a predetermined distribution of the optical path changing portions, and the distribution of the optical path changing portions is provided along the direction of rotation of the disk. In order to change the optical path of the light beam, the refractive indices of the disk may be varied, or the thickness of the disk may be varied. A variety of known manufacturing methods (to be described later) may be used as the method for forming the refractive index distribution in order to form the optical path changing portions of a predetermined refractive index distribution on the disk.

As illustrated in FIG. 1, when optical path changing portions which vary the refractive index between n1 and n2 (wherein n1<n2) are formed on a disk 10, the magnitude of the refraction of the light at the surface of the disk 10 varies by the refractive index n of the portion at which the light is illuminated. Accordingly, the optical path and the beam waist position are varied.

Namely, when a convergent light beam is irradiated at a portion having the refractive index n1 (i.e., a portion having a small refractive index), the angle of emergence $\phi 1$ is relatively large, and the light beam which exits from the disk 10 is converged as shown by the broken line in FIG. 1. Further, when a convergent light beam is irradiated at a portion having the refractive index n2 (i.e., a portion having a large refractive index), the angle of emergence $\phi 1$ is relatively small, and the light beam which exits from the disk 10 is converged as shown by the solid line in FIG. 1. The beam waist position moves in a direction of moving away from the disk 10. Accordingly, by varying the refractive index, the optical path of the light beam can be changed, which allows the beam waist position to be changed.

As illustrated in FIG. 2, when optical path changing portions are formed in which the thickness of a disk 12 is varied between L1 and L2 (where L1<L2), the magnitude of refraction of the light at the surface of the disk 12 is constant. However, the position at which the refraction is generated varies due to the magnitude of the width L. Accordingly, the optical path and the beam waist position vary.

Namely, when a convergent light beam is illuminated at a portion having thickness L1 (i.e., a thin portion), the optical path of the light beam which exits from the disk is relatively short, and the light beam irradiated from the disk 12 is converged as shown by the broken line in FIG. 2. When a convergent light beam is illuminated at a portion having thickness L2 (i.e., a thick portion), the optical path of the light beam transmitted through the disk 12 is long, and the light beam which exits from the disk 12 is converged as illustrated by the solid line in FIG. 2. The beam waist potion moves in a direction of moving away from the disk 12. Accordingly, even if the thickness is varied, the optical path of the light beam can be changed, which allows the beam waist position to be varied.

When such a disk is rotated and a light beam is illuminated thereto, the light beam irradiating position moves the optical path changing portions along the direction of rotation so that the optical path can be changed in a predetermined distribution. Accordingly, the optical path and the beam waist position of the light beam transmitted through the disk are varied in accordance with the rotation of the disk.

In the light beam recording device of the present invention, the light beam is deflected by the deflecting means and is imaged by the scanning lens so as to record an image onto the recording material. The optical path changing portions of the disk are distributed so as to correct the curvature of field generated by the deflecting means and the scanning lens. If the disk is rotated synchronously with the deflection by the deflecting means, the image surface can be made planar, and high-quality recording of the image or the like can be effected.

The distribution of the variation of the optical path for correcting the curvature of field generated by the scanning lens can be determined in the following manner. As illustrated as an example in FIG. 3, a collimator lens 16, a converging lens 18, a collimator lens 20 having focal length $f_1$, and a f·θ lens 22 serving as a scanning lens and having a focal length $f_2$ are disposed at the laser beam irradiating side of a semiconductor laser 14 in that order therefrom. A drum 24 is disposed at the focal position of the laser beam imaged by the f·θ lens 22. An unillustrated deflecting means is disposed between the collimator lens 20 and the f·θ lens 22. The disk 26 relating to the present invention is disposed between the converging lens 18 and the collimator lens 20.

The amount of curvature of field when the laser beam is deflected so that the angle of deflection is a specific angle is α (i.e., the distance from the surface of the drum 24 to the beam waist position). The amount of displacement $D_c$ to correct the amount of curvature of field α (i.e., the distance the focal point is moved; see FIGS. 1 and 2) is determined by the following formula (2).

$$D_c = \alpha \cdot \left( \frac{f_1}{f_2} \right)^2 \quad (2)$$

For example, when the focal length $f_1$ is 10 mm, the focal length $f_2$ is 500 mm, and the amount of curvature of field is 500 μm, an amount of displacement $D_c$=0.2 μm can be obtained by formula (2). Parameters for effecting correction so that the focal position coincides with the surface of the drum 24, i.e., appropriate values for the refractive indices or the thicknesses, can be determined based on the amount of displacement $D_c$. For example, when the refractive index is to be varied, given that the original refractive index of the disk 26 is n1, the refractive index after the variation is n2, and the thickness of the disk 26 is 1 (a constant value), the appropriate value can be determined by the following formula (3).

$$D_c = 1 \cdot \left[ \frac{1}{n_1} - \frac{1}{n_2} \right] \quad (3)$$

For example, when the thickness is 1 mm and the refractive index n1 is 2.0, the variation in the refractive indices Δn=n2−n1=0.008. If the refractive index is varied by Δn, the focal position can be made to coincide with the surface of the drum 24. The above description concerns deflecting the light beam so that the angle of deflection is a specific angle. However, even in a case in which the light beam is deflected so as to scan along a predetermined direction, if values are determined in the same manner as above for angles of deflection which are varied continuously, the distribution of variation of the optical path for correcting the curvature, more specifically, the distribution of the variation of the refractive index or the thickness, can be determined even if there is dispersion in the rate of curvature of field for each scanning lens.

Further, in the present invention, even if the light beam is deflected such that the light beam is scanned at a high speed, if the disk is rotated at a high speed, the disk can be rotated synchronously with the deflection. Because the light beam is not adversely effected by the inertial force of the disk, the image can be recorded at high speed. Moreover, there is no need for a wedge-shaped prism, and both surfaces of the disk can be made parallel. Therefore, the vertical angle of the light beam does not vary, and there is no distortion or the like of the image.

It is preferable that a plurality of optical path changing portions, which have the same distribution of changing the optical path of the transmitted light beam and different rates of changing the optical path, are provided coaxially. In the light beam recording device, the position of the image surface of the light beam imaged by the scanning lens varies due to fluctuations in the surrounding environment such as temperature, humidity, or the like. When the position of the image surface of the light beam deviates from the recording surface of the recording material, a drawback may arise in that the image becomes unclear on the whole. Therefore, the plurality of optical path changing portions which have the same distribution of changing the optical path and different rates of changing the optical path are disposed coaxially. If the disk is moved so that the light beam is transmitted through the optical path changing portion in accordance with the position of the image surface which is varied by fluctuations in the surrounding environment, the position of the image surface can be made constant, and a high-quality image or the like can be recorded.

In the first aspect of the present invention described above, the optical path changing portions which change the transmitted light beam at a predetermined distribution are distributed on the rotatable disk along the direction of rotation thereof. Therefore, a superior effect is achieved in that rapid, high-quality recording of images and the like can be effected.

In accordance with the second aspect of the present invention, the disk, in which the optical path changing portions which change the optical path of the transmitted light beam are distributed, is rotatably disposed in a vicinity of the converging position of the light beam formed by the converging means so that the image surface imaged by the deflecting means and the scanning lens becomes substantially planar. The driving means rotates and drives the disk synchronously with the deflection by the deflecting means. Accordingly, in the same way as in the first aspect of the present invention, the image surface imaged by the scanning lens can be made planar, and high-quality recording of images and the like can be effected.

Further, when the laser beam is deflected so that the scanning speed of the laser beam is high, the disk may be rotated at high speed. Because the light beam is not adversely effected by the inertial force of the disk, the image can be recorded at high speed. Since the disk is disposed in a vicinity of the converging position, the beam diameter of the light beam illuminated-onto the disk is small, and the size of the disk can be made small. Accordingly, the light beam recording device can be made more compact, and the disk can easily be rotated at high speed.

Further, the plurality of optical path changing portions having the same distribution of changing the optical path of the transmitted light beam and having different rates of changing the optical path are disposed coaxially on the disk. The focussing position of the light beam exiting from the scanning lens is detected by the detecting means, and the disk is moved by the moving means along a direction intersecting the direction of rotation so that the detected focussing position becomes a predetermined position. Accordingly, even if the position of the image surface varies due to fluctuations in the surrounding environment, the variation is detected by the detecting means, and the disk is moved by the moving means in a direction intersecting the direction of rotation so that the focussing position becomes the predetermined position. Therefore, the optical path changing portion on which the light beam is illuminated is changed. Due to this change, the position of the image surface is moved. Therefore, the position of the image surface can be made uniform, and high-quality recording of the image can be effected.

In the above-described second aspect of the present invention, the disk, in which the optical path changing portions changing the optical path of the light beam transmitted through the disk are provided along the direction of rotation so as to effect a predetermined distribution, is disposed rotatably in the vicinity of the converging position formed by the converging means, and is rotated and driven synchronously with the deflection by the deflecting means so that the image surface imaged by the deflecting means and the scanning lens becomes substantially planar. Therefore, a superior effect is achieved in that high-quality, rapid recording of images and the like can be effected.

In accordance with the second aspect of the present invention, the variation of the optical path in order to correct the curvature of field generated by the scanning lens can be determined in the following manner. For example, as illustrated in FIG. 15, a collimator lens 116a having a focal length $f_1$ and a beam splitter 118 are disposed at the exiting side of the semiconductor laser 114 in that order therefrom. At the irradiating side of the beam splitter 118, a collimator lens 116b, which has the same focal length $f_1$ as the collimator lens 116a, and a reflecting mirror 120 are disposed. The collimator lens 116b is disposed at a position equivalent to that of the semiconductor laser 114 with respect to the beam splitter 118. An f-θ lens 122 serving as a scanning lens and having a focal length $f_2$ is disposed at the side of the beam splitter 118 at which the laser beam reflected by the reflecting mirror 120 exits. A drum 124 is disposed at the focal position (beam waist) of the laser beam imaged by the f-θ lens 122. An unillustrated deflecting means is disposed between the beam splitter 118 and the f-θ lens 122.

If, for example, the focal length $f_1$ is 10 mm, the focal length $f_2$ is 500 mm, and the amount of curvature of field is 500 μm, the amount of displacement $D_c$=0.2 μm can be obtained by above-mentioned formula (2). Accordingly, the optical path is varied by displacing the reflecting mirror 120, which is disposed at a position equivalent to that of the semiconductor laser 114 with respect to the beam splitter 118, by an amount of displacement $D_c$. The focal position can thereby be made to coincide with the surface of the drum 124 by the f-θ lens 122.

In accordance with the third aspect of the present invention as described previously, the light beam irradiated from the light beam irradiating means is scanned onto the object to be illuminated while being focussed by the scanning lens of the scanning optical system. The converging means is disposed on the optical path between the light beam irradiating means and the scanning lens and converges the light beam which is incident on the converging means. The reflecting surface of the optical axis direction moving member is disposed in a vicinity of the converging position of the light beam converged by the converging means. The reflecting surface is movable in the directions of the optical axis. The optical axis direction changing member changes the optical path due to the movement of the reflecting surface in the directions of the optical axis. The control means controls the optical axis direction moving member so that the focal position of the light beam, which is irradiated from the scanning optical system in the direction of the object to be illuminated, coincides with the position of the object to be illuminated. Accordingly, the light beam illuminated onto the object to be illuminated is scanned while being focused by the scanning lens. Because the focal position coincides with the position of the object to be illuminated, the position at which the light beam is focussed by the scanning lens does not deviate from the object to be illuminated.

In accordance with the third aspect of the present invention structured as described above, the reflecting surface is disposed in a vicinity of a light beam position at which the light beam is converged by the converging means. The optical path is changed by the reflecting surface being moved in directions of the optical axis. Therefore, the focussing position of the light beam focussed onto the object to be illuminated can be easily changed.

Further, in accordance with a fourth aspect of the present invention, the light beam irradiated by the light beam irradiating means is converged by the first converging means in a direction intersecting the optical axis. The light beam is converged by the second converging means in a direction intersecting the converging direction of the first converging means. A first reflecting surface and a second reflecting surface, which are movable along the optical axis, are disposed correspondingly in vicinities of the respective converging positions of the converged light beam. The optical path of a corresponding direction is changed by the first and second, optical path changing means moving the first and second reflecting surfaces. The control means controls the first optical path changing means and the second optical path changing means so that the focussing position of the light beam illuminated from the scanning optical system in the direction of the object to be illuminated coincides with the position of the object to be illuminated. Accordingly, the position at which the light beam is focussed can be made to coincide with the position of the object to be illuminated even if the focussing position is in a direction intersecting the optical axis. Therefore, the configuration (i.e., beam diameter) of the light beam illuminated onto the object to be illuminated is not distorted, and the accuracy of the light beam is not changed.

By using a piezo-electric element, which has the reflecting surface formed by a deposited surface, as the optical path changing means, control can be effected compactly and easily.

In the light beam recording device having a scanning lens which has a magnification in the scanning direction greater than or equal to a predetermined value (e.g., lateral magnification is greater than or equal to a predetermined value), it is necessary to illuminate the light beam over a wide range. In such a light beam recording device, when, for example, an image is recorded, a slight deviation of the focussing position from the object to be illuminated greatly effects the formation of the image. By having the position of the illuminated object coincide with the focussing position of the light beam as described-above, a recording device which records high-quality images can be obtained.

In the above-described fourth aspect of the present invention, the optical paths of the entered light beam are controlled separately with respect to the optical axis and the direction intersecting the optical axis. Therefore, the focal point positions of light beams whose longitudinal magnifications differ due to the positions of the bundles of rays can be adjusted easily.

BRIEF DESCRIPTION OF THE DRAWINGS

FIG. 4 is a schematic structural view of a laser beam recording device relating to a first embodiment.

FIG. 5A is a plan view of an optical path correcting disk relating to the first embodiment.

FIG. 5B is a diagrammatic view illustrating an amount of curvature of field of a laser beam scanned by an f·θ lens.

FIG. 5C is a diagrammatic view illustrating a distribution of refractive indices of the optical path correcting disk illustrated in FIG. 5A.

FIG. 9 is a schematic structural view of a laser beam recording device relating to a third embodiment.

DESCRIPTION OF THE PREFERRED EMBODIMENTS

Figure 1:
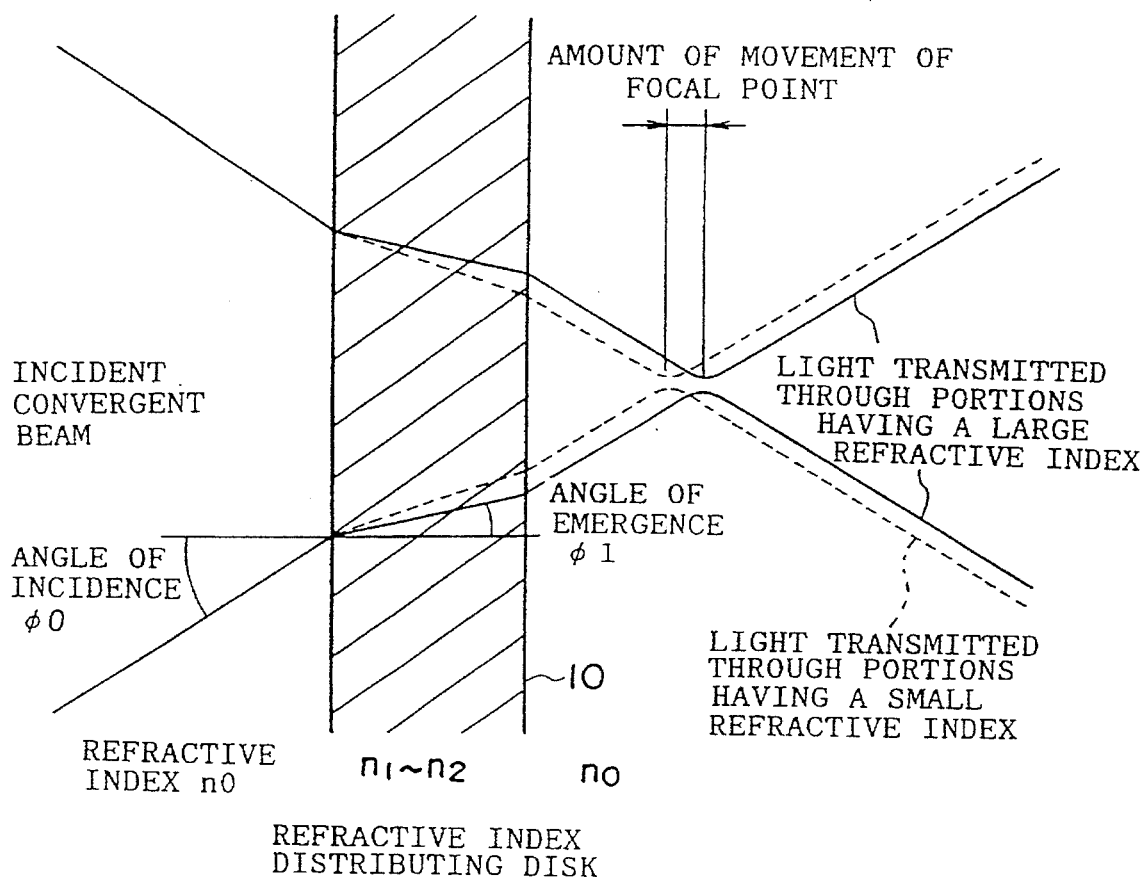
FIG. 1 is a schematic view for explaining movement of a focal length by a disk, in which refractive indices are varied, relating to the present invention.
Figure 2:
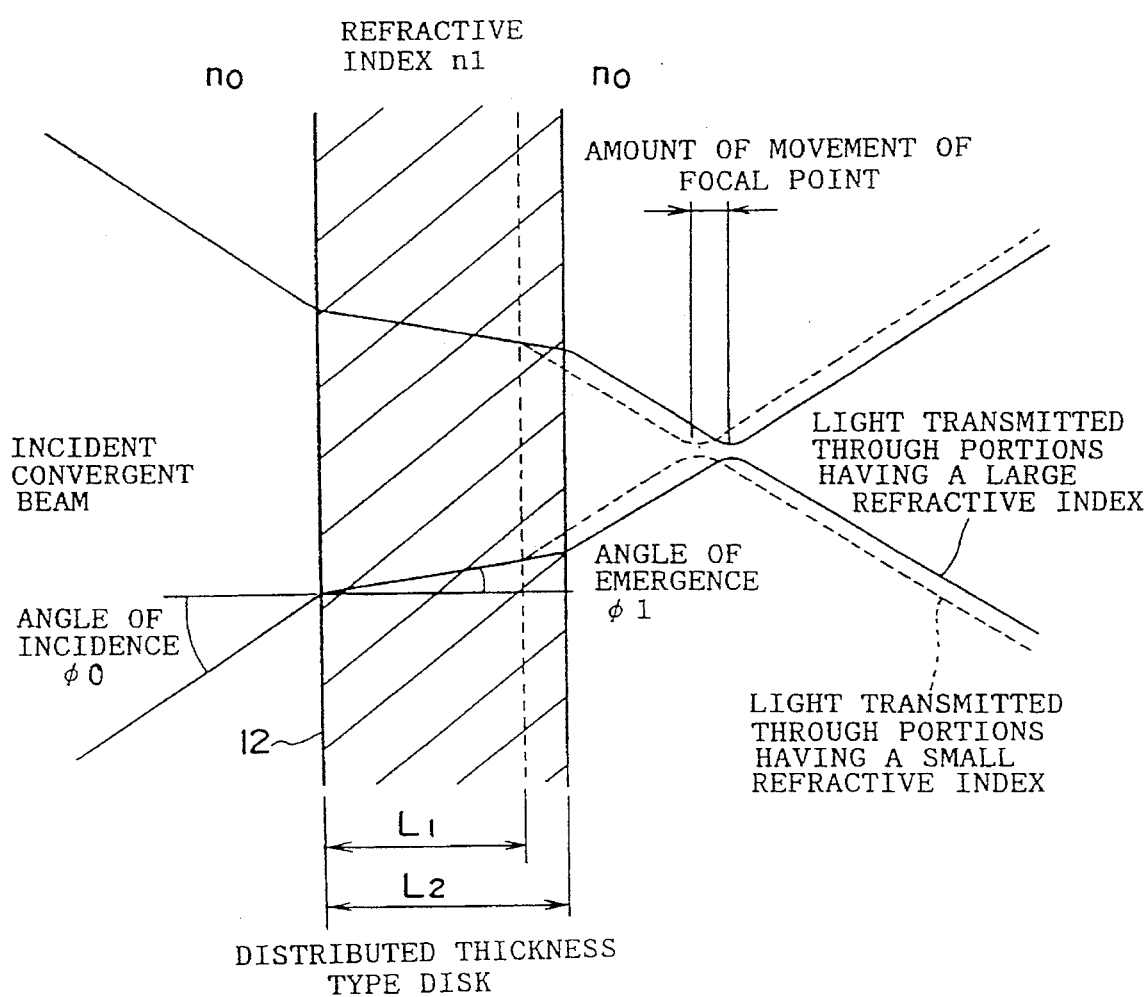
FIG. 2 is a schematic view for explaining movement of a focal length by a disk, whose thickness varies, relating to the present invention.
Figure 3:
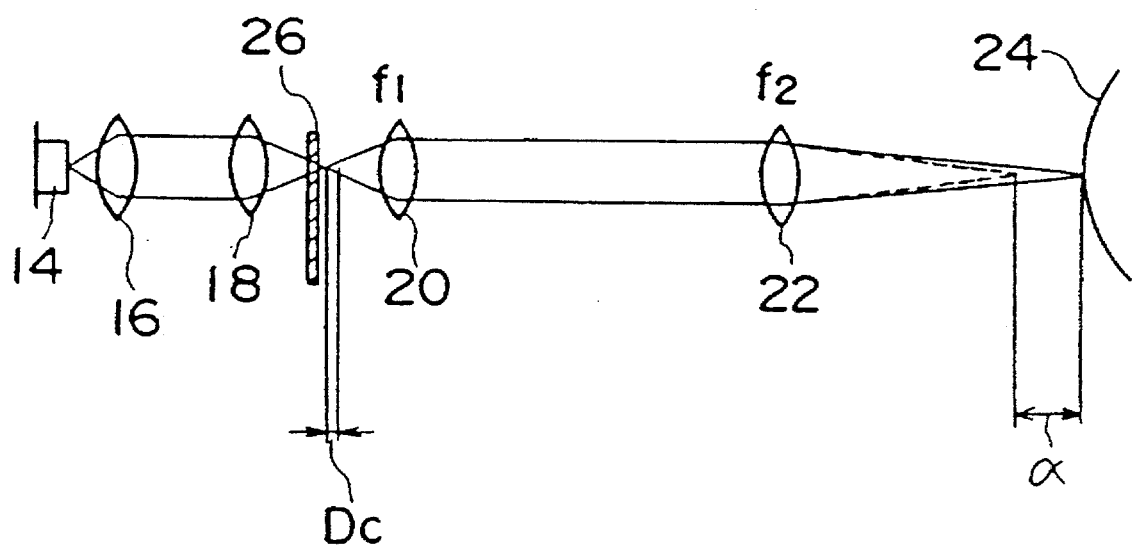
FIG. 3 is a schematic view for explaining a process of determining an amount of variation of an optical path for correcting curvature of field.

A first embodiment of the present invention will now be described in detail with reference to the drawings. A laser beam recording device 30 relating to the first embodiment is illustrated in FIG. 4.

The laser beam recording device 30 includes a semiconductor laser 32 which generates a laser beam. A collimator lens 34 and a first convergent lens 36 are disposed on the laser beam irradiating side of the semiconductor laser 32 in that order therefrom. The collimator lens 34 makes the laser beam irradiated from the semiconductor laser 32 into a parallel bundle of rays. The first convergent lens 36 converges the laser beam which has been made into a parallel bundle of rays. Further, an optical path correcting disk 38 is disposed in a vicinity of the beam waist position of the laser beam which has been converged by the first convergent lens 36.

As illustrated in FIG. 5A, the optical path correcting disk 38 is provided so as to be rotatable around a center O, which is a center of rotation. A plurality of portions 38A, 38B, 38C, 38D having different refractive indices are arranged on the entire disk 38 along the direction of rotation thereof so as to form optical path changing portions. In the present embodiment, an amount of curvature of field from one end to another end of the scanning direction of the laser beam when the laser beam is imaged on the image surface by a polygon mirror 46 and an f·θ lens 52 which will be described later, is set in advance as illustrated as an example in FIG. 5B. The respective refractive indices and area sizes of each optical path changing portion are set so that the curved image surface becomes planar, i.e., so that the variation of the refractive indices over one revolution of the disk 38 is distributed as illustrated in FIG. 5C.

The various methods illustrated in Table 1 can be used in order to form the distribution of the refractive indices of the disk 38.

TABLE 1

| Method | Material | Components | Features | Drawbacks |
| --- | --- | --- | --- | --- |
| ion exchange method | multi-component glass | Ag, Cu, Tl, Cs, Li, Pb | smooth profile | long processing time |
| application of voltage to electric field/ion exchange method | multi-component glass | Ag, Cu, Tl, Cs, Li, Pb | diffusion length is large Processing time is short | insulation is difficult |
| molecular stuffing method CVD method | porous quartz glass | Cs, Ag, Pb | degrees of freedom of profile | processing is complicated |
| VAD method | quartz glass | Ge, P, B, F, Ti | degrees of freedom of profile | workability is low resolution is low |
| PCVD method | quartz glass | $Si_3N_4$ | degrees of freedom of profile | processing of base plate |
| sol-gel method | porous quartz glass | TBOG | degrees of freedom of profile copy reduction is possible | peeling and cracks form easily |
| photodissociation method | porous quartz glass | $(CH_3)_3SnI$ | processing time is short hight resolution | $\Delta n$ is small |

As illustrated in FIG. 4, the optical path correcting disk 38 is rotated by driving force of a motor 40 which is transferred to the disk 38. The motor 40 is connected to a driving control circuit 42. A signal representing an angle of rotation of the polygon mirror 46, which serves as a deflecting means and which will be described later, is input to the driving control circuit 42. The motor 40 and the driving control circuit 42 form the driving means of the present invention. Based on the inputted signal, the driving control circuit 42 drives the motor 40 so that the rotation of the disk 38 and the rotation of the polygon mirror 46 are synchronized, i.e., so that the disk 38 rotates one time for each one scan of the laser beam due to the rotation of the polygon mirror 46.

A second convergent lens 44 is disposed at the laser beam exiting side of the optical path correcting disk 38. The beam diameter of the laser beam which is transmitted through the disk 38 is converged by the second convergent lens 44. The polygon mirror 46 is disposed on the laser beam exiting side of the second convergent lens 44. The laser beam which exits from the second convergent lens 44 is incident on the polygon mirror 46.

A semiconductor laser for synchronizing 48, which generates a laser beam for synchronizing, is disposed in a vicinity of the polygon mirror 46. A collimator lens 50 is disposed at the laser beam irradiating side of the semiconductor laser for synchronizing 48. The laser beam irradiated from the semiconductor laser for synchronizing 48 is made into a parallel bundle of rays at the collimator lens 50. Thereafter, the laser beam is incident on the polygon mirror 46. The laser beam from the second convergent lens 44 and the laser beam from the collimator lens 50 are irradiated onto almost the same area of the polygon mirror 46, are deflected in the same way by the rotation of the polygon mirror 46, and are incident on the f·θ lens 52 disposed at the laser beam exiting side of the polygon mirror 46.

A photosensitive drum 54 is disposed on the optical path of the laser beam which is irradiated from the semiconductor laser 32 and which is transmitted through the f·θ lens 52. The photosensitive drum 54 is disposed along the scanning direction of this laser beam. The photosensitive drum 54 rotates with an unillustrated photosensitive material wound thereon. The laser beam is deflected by the polygon mirror 46 so as to scan the range illustrated by the broken line in FIG. 4, and is illuminated onto a recording surface of the photosensitive material.

A reflecting mirror 56 is disposed on the optical path of the laser beam which is irradiated from the semiconductor laser for synchronizing 48 and which is transmitted through the f·θ lens 52. The reflecting mirror 56 is disposed along the scanning direction of this laser beam. A linear encoder 58 is disposed at the laser beam exiting side of the reflecting mirror 56. The laser beam is deflected by the polygon mirror 46 so as to scan the range illustrated by the dot-chain line in FIG. 4. The linear encoder 58 is formed of a non-transparent plate material in which a plurality of belt-shaped transparent portions of equal widths is formed at equal pitches.

An unillustrated photoelectric converter is disposed at the laser beam exiting side of the linear encoder 58. When the laser beam scans the linear encoder 58, the portions of the laser beam which are transmitted through the transparent portions are received by the photoelectric converter which outputs a pulse signal. The pulse signal is input to an unillustrated control means, and the polygon mirror 46 is controlled so that the pulse interval of the pulse signal is constant. Accordingly, the laser beam is deflected so as to scan a plane (i.e., the recording surface) at a constant scanning speed. The intervals between pixels of the image recorded on the photosensitive material are thereby made constant.

Next, operation of the first embodiment will be described. When the polygon mirror 46 is rotated, a signal representing the angle of rotation of the polygon mirror 46 is input to the driving control circuit 42. The driving control circuit 42 rotates the disk 38 synchronously with the rotation of the polygon mirror 46. In the present embodiment, the laser beam is scanned six times for every one rotation of the polygon mirror 46. Therefore, the disk 38 is rotated six times for every one rotation of the polygon mirror 46. The laser beam irradiated from the semiconductor laser 32 enters the disk 38 via the collimator lens 34 and the first convergent lens 36.

Because the disk 38 rotates as described above, the area at which the laser beam is illuminated onto the disk 38 varies in accordance with the rotation of the disk 38 so that the beam waist position varies continuously in accordance with the distribution of reflective indices illustrated in FIG. 5C. The laser beam which is transmitted through the disk 38 is incident on the polygon mirror 46 via the second convergent lens 44. After being deflected by the polygon mirror 46, the laser beam is imaged by the f·θ lens 52 onto the recording surface of the photosensitive material.

As described above, the beam waist position of the laser beam which is incident on the f·θ lens 52 is varied by the optical path changing portions of the disk 38. Due to this variation, the curvature of field generated by the f·θ lens 52 is canceled. Therefore, the laser beam is always imaged on the recording surface of the photosensitive material from one end in the scanning direction to the other end. Accordingly, drawbacks such as lack of clarity of portions of the image recorded on the photosensitive material do not occur, and a high-quality image can be obtained.

Figure 6A:
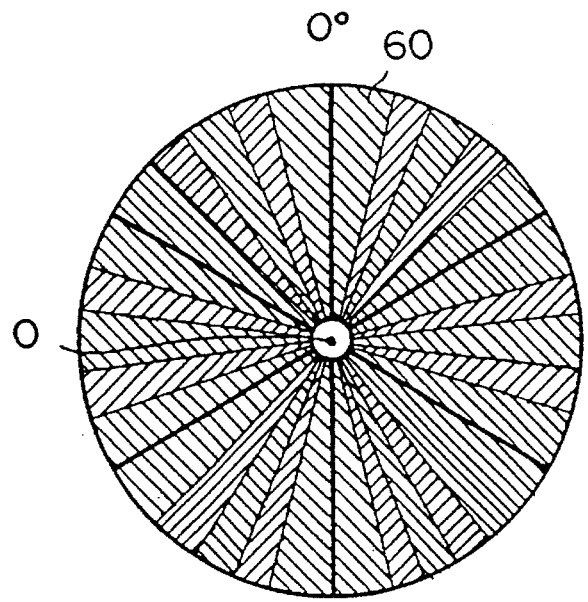
FIG. 6A is a plan view illustrating another embodiment of the optical path correcting disk.
Figure 6B:
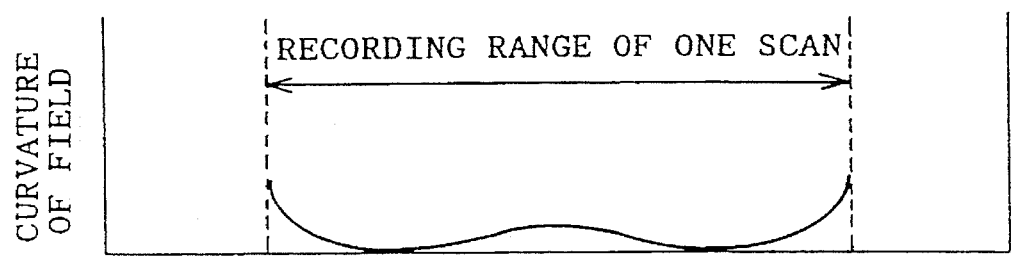
FIG. 6B is a diagrammatic view illustrating an amount of curvature of field of a laser beam scanned by an f·θ lens.
Figure 6C:
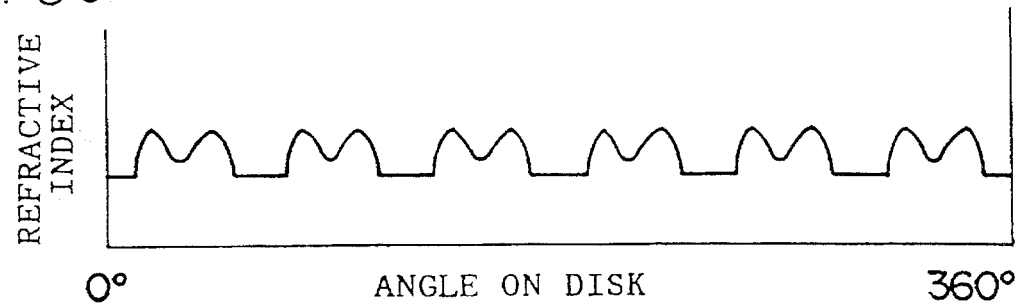
FIG. 6C is a diagrammatic view illustrating a distribution of refractive indices of the optical path correcting disk illustrated in FIG. 6A.

The pattern of the optical image changing portions provided on the optical path correcting disk is not limited to the example illustrated in FIG. 5A. As shown in FIG. 6A as an example, an optical path correcting disk 60 is divided into six areas by respective lines which connect a center O of the disk with dividing points which divide the circumference of the disk 60 into six equal parts. Optical path changing portions having the refractive index distribution illustrated in FIG. 6C are formed respectively in each of the six areas. Optical path correction for one scan of the laser beam is effected at a portion corresponding to one area of the optical path correcting portions.

When the disk 60 is applied to the laser beam recording device 30, the laser beam is scanned six times for each rotation of the polygon mirror 46. Therefore, the disk 60 may be controlled such that the rotation thereof is synchronized with the rotation of the polygon mirror 46 and the respective rotational frequencies of the disk 60 and the polygon mirror 46 are the same. Accordingly, even if the speed of rotation of the polygon mirror 46 is increased in order to increase the scanning speed and record the image at high speed, the rotation of the disk 60 can easily be made to follow the rotation of the polygon mirror 46.

Next, a second embodiment of the present invention will be described. Parts which are the same as those of the first embodiment will be denoted with the same reference numerals, and description thereof will be omitted.

Figure 8A:
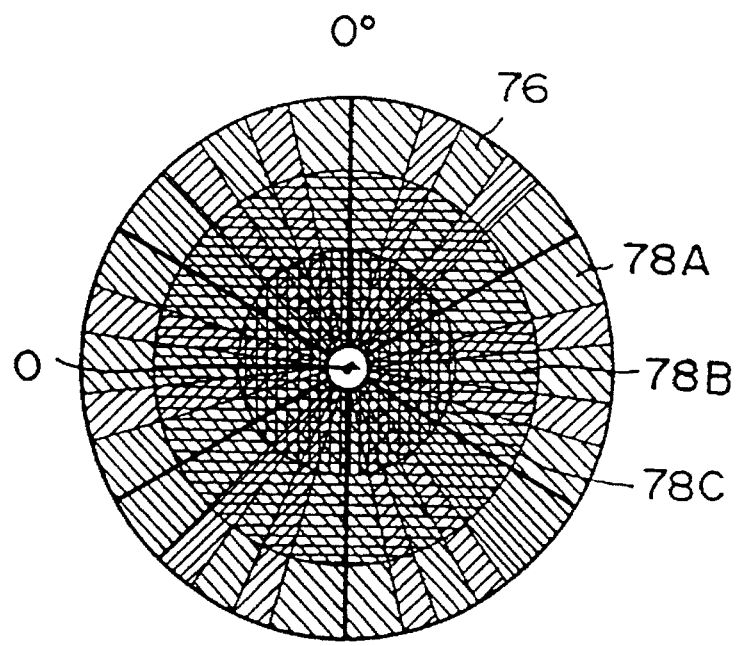
FIG. 8A is a plan view of an optical path correcting disk relating to the second embodiment.
Figure 8B:
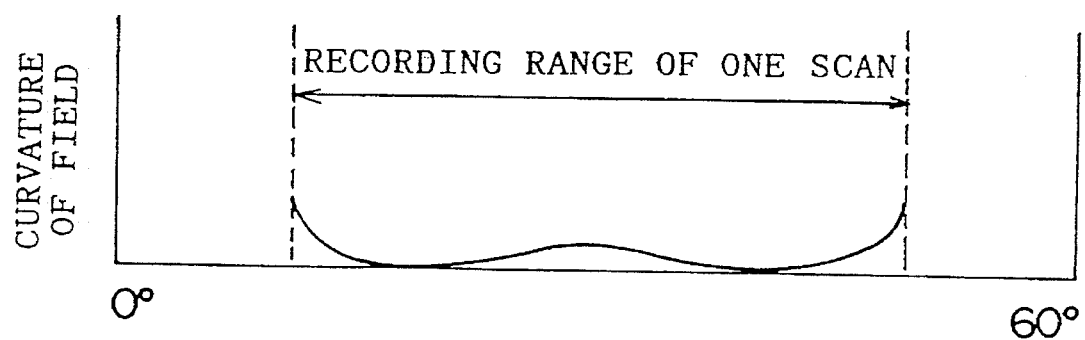
FIG. 8B is a diagrammatic view illustrating an amount of curvature of field of a laser beam scanned by an f·θ lens.

In the same way as the above-described disk 60, the optical path correcting disk 76 illustrated in FIG. 8A is divided into six areas by respective lines which connect a center O of the disk 76 with dividing points which divide the circumference of the disk 76 into six equal parts. Further, the disk 76 is formed by three optical path changing portions 78A, 78B, 78C which are arranged coaxially with respect to the center O. Each of the optical path changing portions 78A, 78B, 78C are formed by six areas each having the refractive index distribution illustrated in FIG. 5C.

Figure 8C:
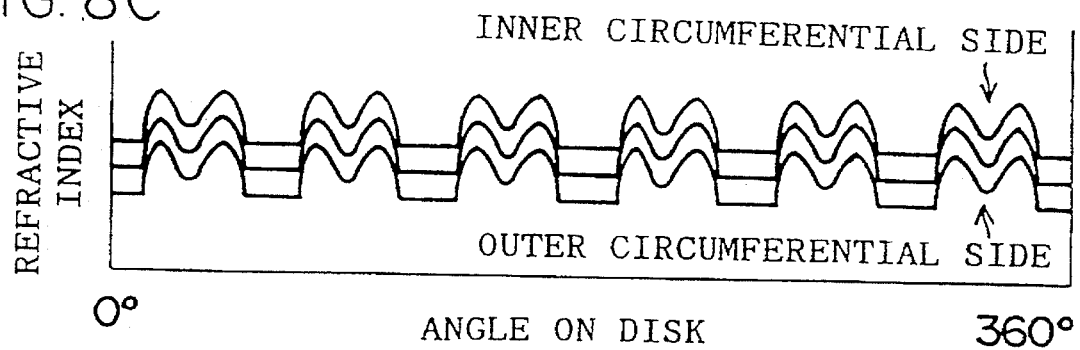
FIG. 8C is a diagrammatic view illustrating a distribution of refractive indices of the optical path correcting disk illustrated in FIG. 8A.

The refractive index distribution of each of the optical path correcting portions 78A, 78B, 78C is the same. However, the respective refractive indices are different on the whole. Namely, as illustrated in FIG. 8C, the refractive index of the outermost optical path changing portion 78A is low on the whole. The refractive index of the optical path changing portion 78B, which is provided adjacent to the optical path changing portion 78A at the inner circumferential side thereof, is higher on the whole than the refractive index of the optical path changing portion 78A. The refractive index of the innermost optical path changing portion 78C is the highest.

Accordingly, when the laser beam which exits from the first convergent lens 36 is transmitted through the outermost optical path changing portion 78A, the position of the image surface when the laser beam is not transmitted through the disk 78 is nearest to the f·θ lens 52. As the position through which the laser beam is transmitted is moved toward the inner circumferential side of the disk 78, the position of the image surface when the laser beam is not transmitted through the disk 78 moves in a direction of moving away from the f·θ lens 52.

Figure 7:
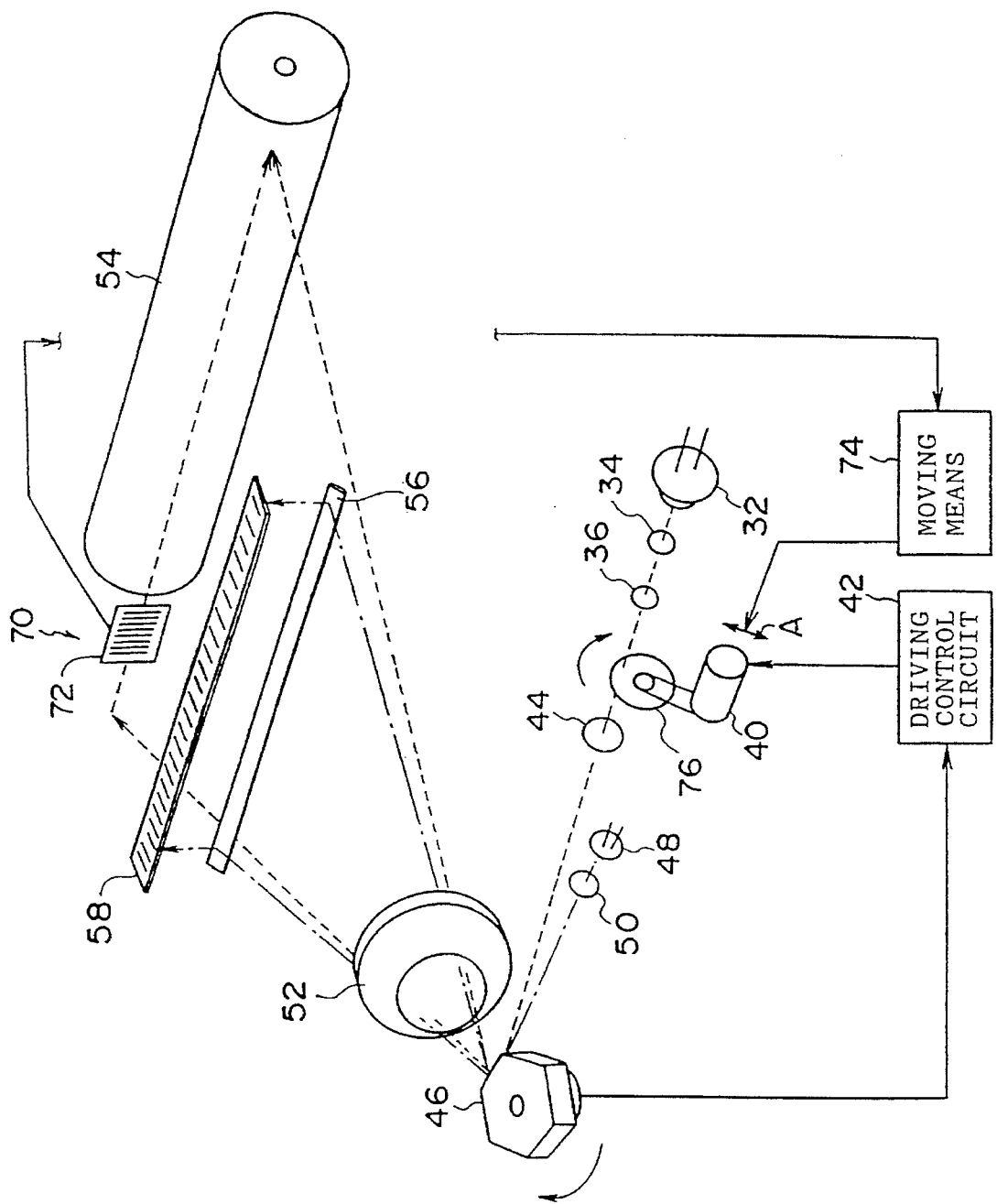
FIG. 7 is a schematic structural drawing of a laser beam recording device relating to a second embodiment.

As illustrated in FIG. 7, in a laser beam recording device 70 of the second embodiment, a position sensor 72 serving as a detecting means is disposed in a vicinity of the photosensitive drum 54. The position sensor 72 is formed of a filter and a photoelectric converter. The filter is formed of a transparent plate material in which a plurality of belt-shaped non-transparent portions of equal widths is formed at equal pitches. The photoelectric converter (unillustrated) is disposed at the laser beam exiting side of the filter. The position sensor 72 is disposed such that the light-receiving surface of the filter is flush with the recording surface of the photosensitive material wound around the photosensitive drum 54.

The widths and pitches of the non-transparent portions provided in the filter are more narrow than those of the linear encoder 58. The beam diameter of the laser beam is the same. When the laser beam is scanned on the filter of the position sensor 72, only the light which is transmitted through the transparent portions of the filter is received by the photoelectric converter. The photoelectric converter outputs a direct current signal whose level fluctuates in a sinusoidal waveform.

The position sensor 72 is connected to a moving means 74. The above-mentioned signal is output to the moving means 74. The moving means 74 moves the disk 76 and the motor 40 in the directions of arrow A with respect to the optical axis of the laser beam. Accordingly, the position of the laser beam which is transmitted through the disk 76 is moved along the radial direction of the disk 76 so that the optical path changing portion through which the laser beam is transmitted is changed.

Next, operation of the second embodiment will be described. The laser beam irradiated from the semiconductor laser 32 is transmitted through any of the optical path changing portions 78A through 78C of the disk 76, is deflected by the polygon mirror 46, and scans the light-receiving surface of the position sensor 72 and the recording surface of the photosensitive material wound around the photosensitive drum 54. Due to these scannings, a direct current signal whose level fluctuates in a sinusoidal waveform is output from the position sensor 72. The magnitude of the fluctuation of the level of the signal (i.e., the difference between the maximum value and the minimum value) varies according to the beam diameter on the filter of the laser beam which is illuminated onto the filter. When the beam diameter is small, the fluctuation is large. As the beam diameter increases, the energy per unit area becomes smaller. Therefore, the fluctuation becomes smaller.

The signal is input to the moving means 74. The disk 76 and the motor 40 are moved so that the magnitude of the fluctuation of the pulse of the signal inputted to the moving means 74 becomes a maximum. The curvature of field of the laser beam which is imaged by the f·θ lens 52 is corrected as in the first embodiment. However, the position of the planar image surface varies in accordance with fluctuations in the surrounding environment. In the present embodiment, when the position of the image surface deviates from the recording surface of the photosensitive material, the deviation is detected as a decrease in the magnitude of the fluctuation of the level of the signal outputted from the position sensor 72. Accordingly, the moving means 74 moves the disk 76 and the motor 40 so that the magnitude of the fluctuation of the level of the signal outputted from the position sensor 72 becomes a maximum. Therefore, the position of the image surface is corrected so as to coincide with the recording surface of the photosensitive material, and a high-quality image can be recorded regardless of fluctuations in the surrounding environment.

Next, a third embodiment of the present invention will be described. Parts which are the same as those of the first and second embodiments are denoted with the same reference numerals, and description thereof is omitted.

Figure 10:
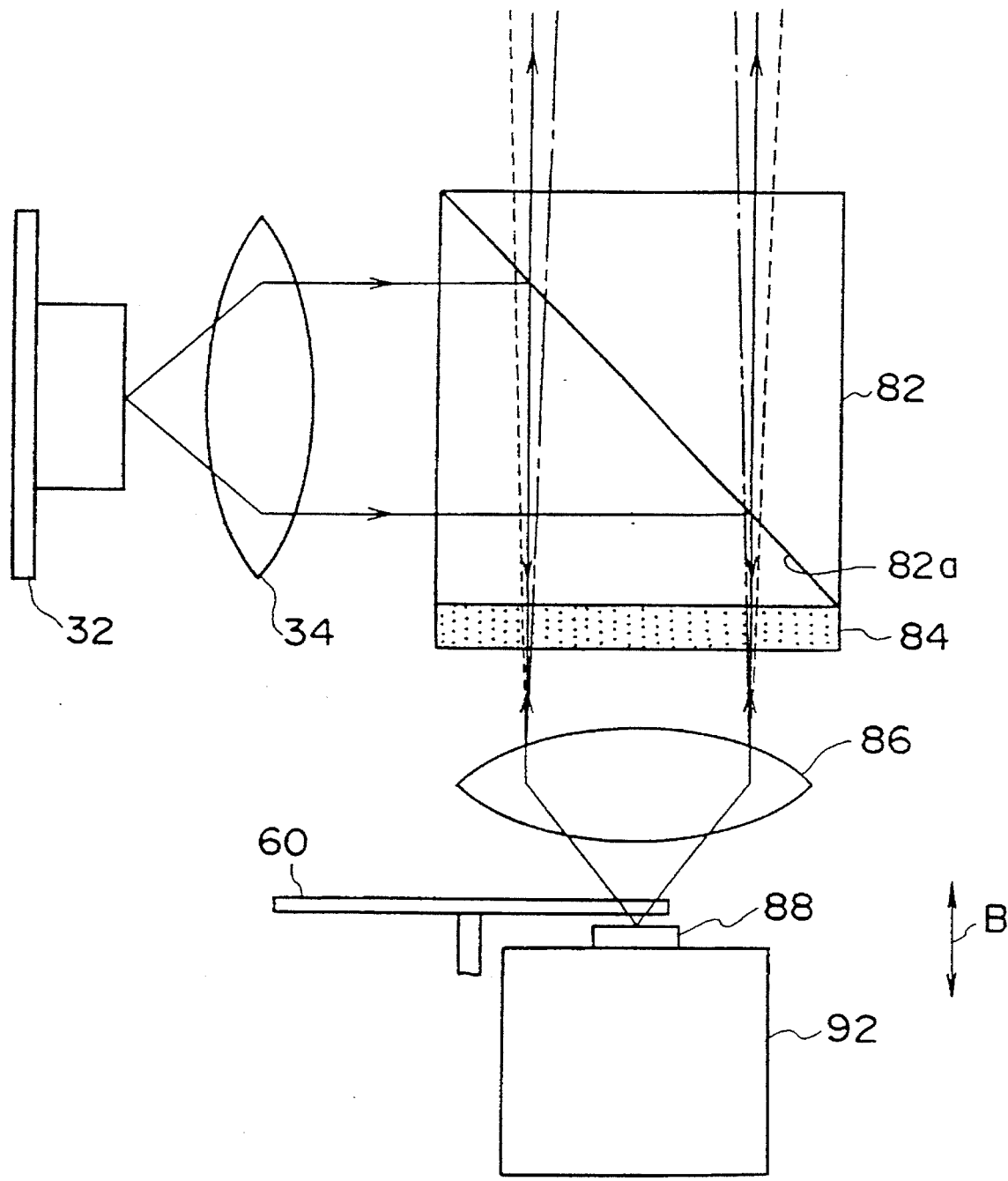
FIG. 10 is a schematic structural view of a periphery of a polarization beam splitter of the laser beam recording device relating to the third embodiment.

As illustrated in FIG. 9, in a laser beam recording device 80 of the third embodiment, a polarization beam splitter 82 is disposed on the laser beam exiting side of the first collimator lens 34. As illustrated in FIG. 10, the laser beam which exits from the first collimator lens 34 is reflected by a reflecting surface 82a of the polarization beam splitter 82 and is transmitted through a quarter-wave plate 84 attached to a surface of the polarization beam splitter 82.

A second collimator lens 86, the optical path correcting disk 60 illustrated in FIG. 6A, and a reflecting mirror 88 are disposed in a vicinity of the quarter-wave plate 84 in that order along the optical path. The laser beam which is transmitted through the quarter-wave plate 84 is converged by the second collimator lens 86 and is transmitted through the disk 60. Thereafter, the laser beam is reflected by the reflecting mirror 88 so that the optical path thereof is changed 180°. The laser beam reflected by the reflecting mirror 88 is again transmitted through the disk 60, the second collimator lens 86 and the quarter-wave plate 84, and is incident on the polarization beam splitter 82. The polarizing angle of the laser beam which is incident on the polarization beam splitter 82 is rotated 90° by the laser beam being transmitted through the quarter-wave plate 84 twice. Therefore, the laser beam is transmitted through the reflecting surface 82a, and exits from the polarization beam splitter 82.

Further, a driving control circuit 94 is connected to the position sensor 72. The signal outputted from the position sensor 72 is input to the driving control circuit 94. The driving control circuit 94 is connected to a piezo-electric element 92. Voltage is applied to the piezo-electric element 92 so that the magnitude of the fluctuation of the level of the inputted signal becomes a maximum. As illustrated in FIG. 10, the reflecting mirror 88 is attached to a surface of the piezo-electric element 92. When voltage is applied to the piezo-electric element 92, distortion is generated in the interior thereof in accordance with the magnitude of the voltage so that the piezo-electric element 92 is displaced along the directions of approaching and moving away from the polarization beam splitter 82 (i.e., the directions of arrow B in FIG. 10). In accordance with this displacement, the reflecting mirror 88 also moves along the directions of arrow B in FIG. 10.

When the reflecting mirror 88 is positioned at an original position which is determined in advance, the laser beam reflected by the reflecting mirror exits from the polarization beam splitter 82 at the beam width illustrated by the solid lines in FIG. 10. When the reflecting mirror 88 is moved to a position near to the polarization beam splitter 82, the optical path of the laser beam from the reflecting mirror 88 to the second collimator lens 86 is shortened, and the laser beam reflected by the reflecting mirror 88 exits at the beam width illustrated by the broken lines in FIG. 10. Here, the beam width is slightly wider than the beam width when the reflecting mirror 88 is positioned at the original position. Accordingly, the beam waist position of the laser beam imaged by the f·θ lens 52 is moved closer to the photosensitive drum 54.

When the reflecting mirror 88 is moved to a position away from the polarization beam splitter 82, the optical path of the laser beam from the reflecting mirror 88 to the second collimator lens 86 is lengthened, and the laser beam reflected by the reflecting mirror 88 exits at the beam width illustrated by the dot-chain line in FIG. 10. Here, the beam width is slightly narrower than the beam width when the reflecting mirror 88 is positioned at the original position. Accordingly, the beam waist position of the laser beam imaged by the f·θ lens 52 is moved away from the photosensitive drum 54.

Next, operation of the third embodiment will be described. The laser beam, which is irradiated from the semiconductor laser 32, reflected by the reflecting mirror 88, and transmitted through the polarization beam splitter 82, is deflected by the polygon mirror 46 and scans the light-receiving surface of the position sensor 72 and the recording surface of the photosensitive material. The curvature of field of the laser beam imaged by the f·θ lens 52 is corrected by the optical path changing portions provided on the disk 60, but the position of the image surface is varied by fluctuations in the surrounding environment. However, when the position of the image surface deviates from the recording surface of the photosensitive material, the deviation is detected as a decrease in the magnitude of the fluctuation of the level of the signal outputted from the position sensor 72. The voltage applied to the piezo-electric element 92 is varied so that the magnitude of the fluctuation of the level of the signal outputted from the position sensor 72 becomes a maximum. Accordingly, the position of the reflecting mirror 88 is moved. As a result, the position of the image surface is corrected so as to coincide with the recording surface of the photosensitive material. A high-quality image can be recorded regardless of fluctuations in the surrounding environment.

In the third embodiment, the reflecting mirror 88 is attached to a surface of the piezo-electric element 92. However, a light reflecting material may be deposited on the piezo-electric element 92 so as to form a mirror surface.

In the present embodiment, the semiconductor laser 32 is used as a light beam irradiating means. However, the present invention is not limited to the same. A gas laser such as He—Ne, or a liquid laser or the like may be used.

The present embodiment was explained by using the example of the optical path correction disk provided with the optical path changing portions which change the optical path by varying the refractive indices. However, the present invention is not limited to the same, and optical path changing portions may be provided in which the optical path is changed due to variations in the thickness of the disk.

Further, in the above-described embodiment, the optical path changing portions are structured such that a plurality of portions of differing refractive indices are arranged thereat. Due to this construction, the refractive indices can be varied in stages. However, the present invention is not limited to the same; the optical path changing portions may be structured such that the refractive indices or the thickness is varied continuously.

Next, the fourth embodiment of the present invention will be described. Parts in the fourth embodiment which are the same as those in the first through the third embodiments are denoted with the same reference numerals, and description thereof is omitted.

Figure 13:
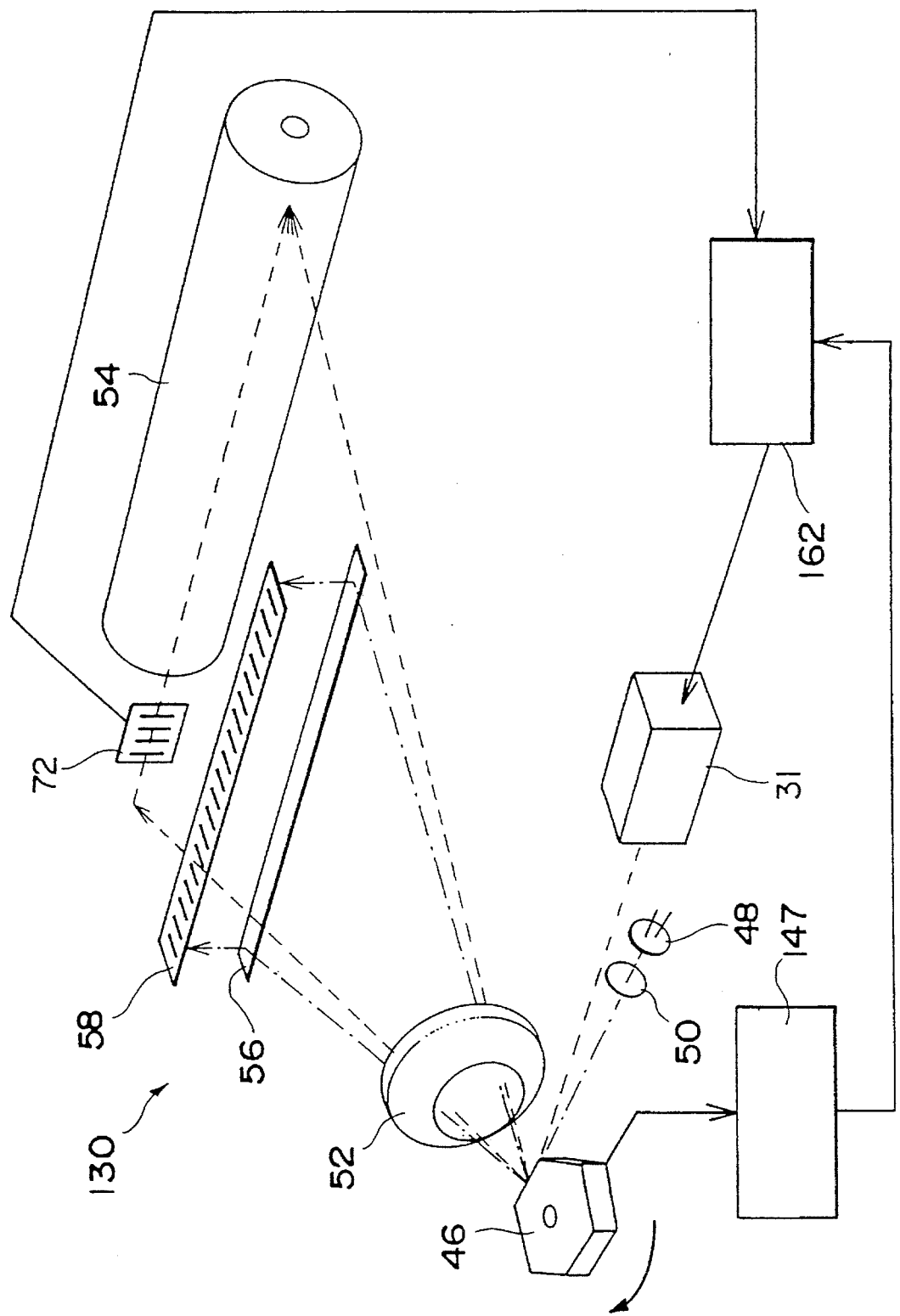
FIG. 13 is a perspective view illustrating a schematic structure of a laser beam recording device to which the present invention may be applied.

As illustrated in FIG. 13, a laser beam recording device 130 relating to the fourth embodiment is provided with a laser beam irradiating device 31 which irradiates a laser beam of a substantially parallel bundle of rays. The laser beam irradiating device 31 may be structured so as to have a semiconductor laser, and the semiconductor laser may be directly modulated. Alternatively, the laser beam irradiating device 31 may have a modulating means formed of a gas laser (e.g., an AR laser, a He—Ne laser or the like) and a converter (AOM, EOM or the like). In this case, the laser beam irradiated from the gas laser is modulated by the modulating means. The polygon mirror 46 is disposed at the irradiating side of the laser beam irradiating device 31 so that the laser beam is incident on the polygon mirror 46. The rotation of the polygon mirror 46 is controlled based on a signal outputted from the linear encoder 58 which will be described later. The signal representing the angle of rotation of the polygon mirror 46 is input to a driving control circuit 147.

The semiconductor laser for synchronizing 48, which irradiates a laser beam for synchronizing, is disposed in a vicinity of the polygon mirror 46. Alternatively, the laser beam for synchronizing can be irradiated by the following method without using the semiconductor laser for synchronizing 48. Namely, an AOM is disposed at the irradiating side of the laser beam irradiating device 31 or inside of the laser beam irradiating device 31. The laser beam for synchronizing can be formed by being divided from the laser beam by the AOM. In this case, it suffices to use a single light source in the laser beam irradiating device 31.

Figure 11:
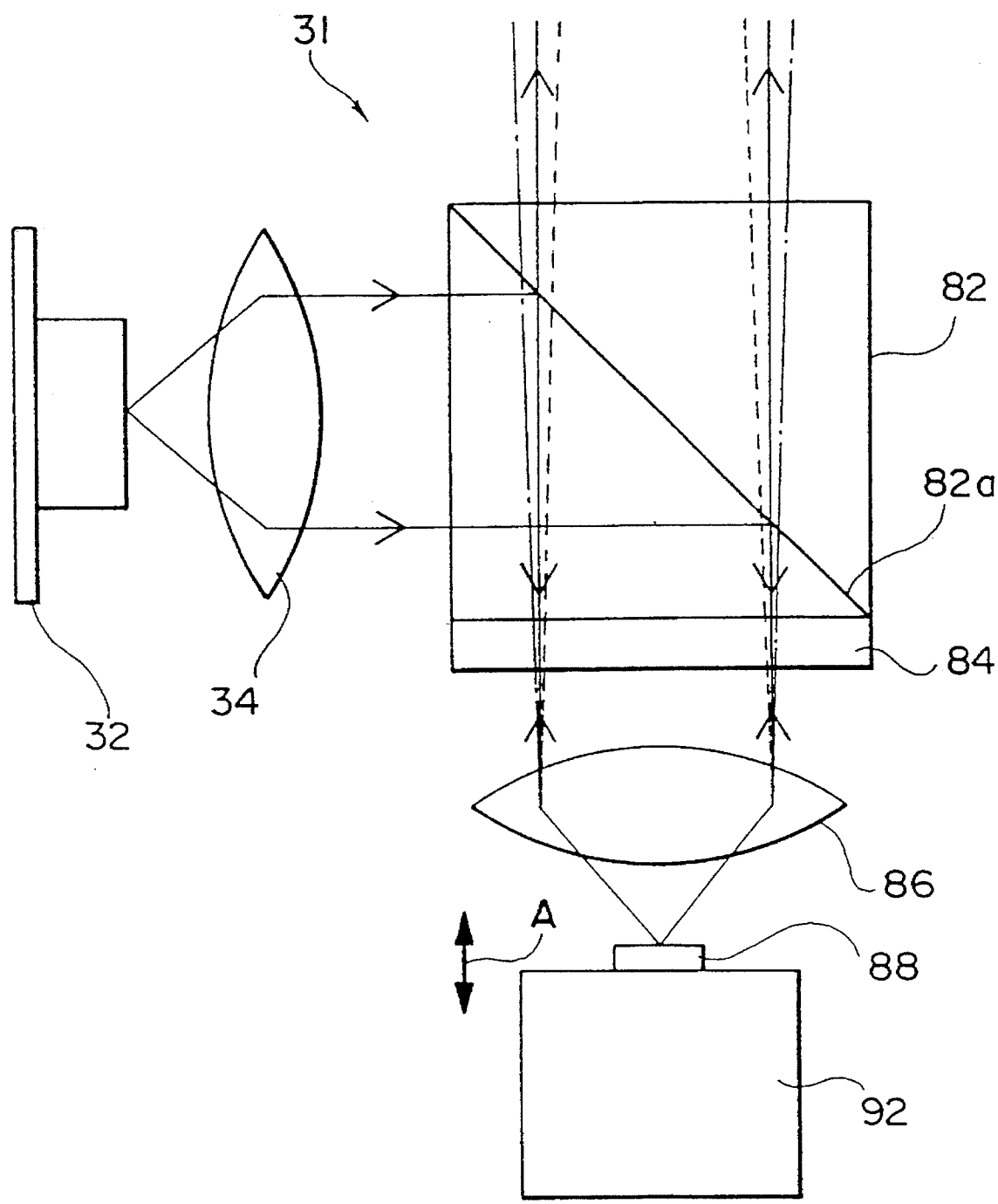
FIG. 11 is a plan view illustrating a schematic structure of a laser beam irradiating device relating to a fourth embodiment.

As illustrated in FIG. 11, the laser beam irradiating device 31 includes the semiconductor laser 32, the first collimator lens 34, the polarization beam splitter 82, the quarter-wave plate 84, the second collimator lens 86, the reflecting mirror 88, and the piezo-electric element 92. The functions of these elements are the same as in the third embodiment.

Figure 12:
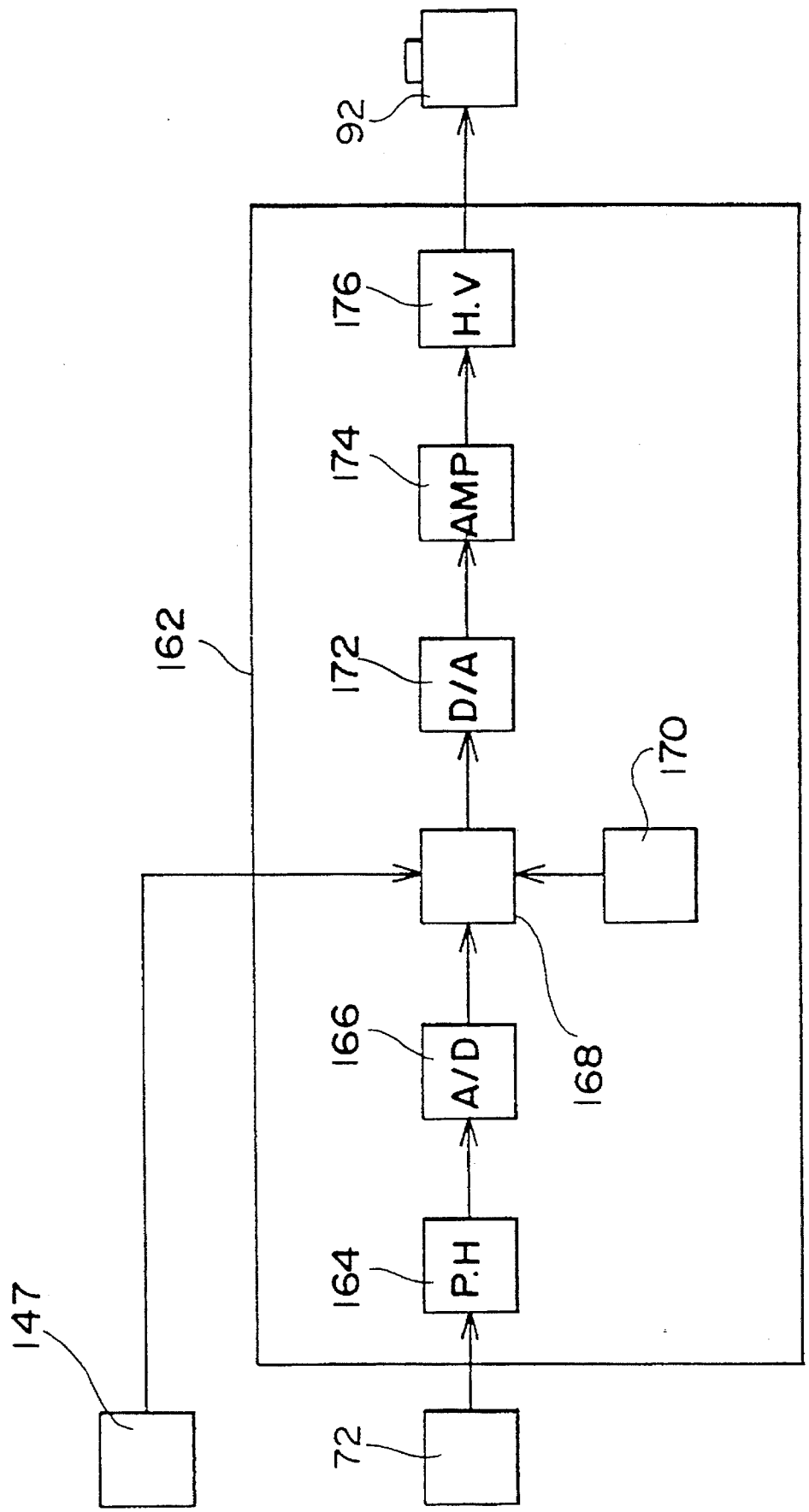
FIG. 12 is a block diagram illustrating a schematic structure of a focal position controlling device relating to the fourth embodiment.

As shown in FIG. 12, the position sensor 72 is connected to a focal position control device 162 and outputs a signal thereto. In accordance with the inputted signal, the focal position control device 162 changes the optical path so that the laser beam irradiated from the laser beam irradiating device 31 is made into a divergent bundle of rays, a convergent bundle of rays, or a parallel bundle of rays. Accordingly, the position of the focal point (beam waist) of the laser beam illuminated onto the photosensitive drum 54 via the f·θ lens 52 can be moved along the directions of the optical axis.

Further, the position sensor 72 is connected to the piezo-electric element 92 via the focal position control device 162. The focal position control device 162 applies voltage to the piezo-electric element 92 so that the magnitude of the fluctuation of the level of the signal outputted from the position sensor 72 becomes a maximum.

In FIG. 12, the flow for deforming the piezo-electric element 92 based on the signal outputted from the position sensor 72 is illustrated as a block diagram.

The signal outputted from the position sensor 72 is input to a peak hold circuit 164. The peak hold circuit 164 holds the maximum and minimum values as analog values. The analog signals of the held maximum and minimum values are converted into digital values by an analog-digital converter 166, and are inputted to a control portion 168.

The control portion 168 is formed by a microcomputer in which a CPU, a RAM, a ROM and the like are connected by busses. Further, a storing device 170 is connected to the control portion 168. The storing device 170 stores a table which corresponds, on the one hand, the exiting direction of the laser beam from the f·θ lens 52 at a reference position measured in advance (a position of the object to be illuminated at a predetermined distance L from the f·θ lens 52) and, on the other hand, an offset value of the amount of curvature of field from the reference position. In other words, a curve expressing the curvature of field (see FIG. 14) is stored in the storing device 170. Accordingly, the control portion 168 uses the inputted signal, i.e., the signal at the reference position, and refers to the table so as to output an offset amount which corresponds to the curvature of field which is generated in correspondence with the exiting position of the laser beam.

The offset amount outputted from the control portion 168 is converted into an analog value by a digital-analog converter 172, and is output to a high-voltage driving circuit 176 via an amplifying circuit 174. The high-voltage driving circuit 176 applies a high voltage corresponding to the inputted analog signal to the piezo-electric element 92. Accordingly, the piezo-electric element 92 is deformed, and the optical path can be changed.

A signal representing the angle of rotation of the polygon mirror 46 is input to the control portion 168 from the above-described driving control circuit 147. Based on the inputted signal, the control portion 168 outputs a signal so that the piezo-electric element 92 is controlled synchronously with the rotation of the polygon mirror 46, i.e., during one scan of the laser beam due to the rotation of the polygon mirror 46.

The signal outputted from the position sensor 72 is input to the focal position control circuit 162. The peak hold circuit 164 holds the value, and the value is temporarily stored in the microcomputer of the control portion 168 via the analog-digital converter 166. Next, the signal outputted from the position sensor 72 when the voltage applied to the piezo-electric element 92 is varied and the piezo-electric element 92 is slightly deformed is read. This signal is compared to the value from the previous time. When the compared value has increased, the piezo-electric element 92 is deformed in the same direction, and when the compared value has decreased, the piezo-electric element 92 is deformed in the opposite direction. This process is repeated until the magnitude of the fluctuation of the level of the signal reaches a maximum (i.e., maximum/minimum calculating process). Accordingly, the beam diameter (i.e., the beam waist) of the laser beam illuminated onto the position sensor 72 becomes a minimum, and the amount of deformation of the piezo-electric element 92 corresponding to the direction of deflection in which the laser beam is illuminated to the position sensor 72 is determined.

Figure 14:
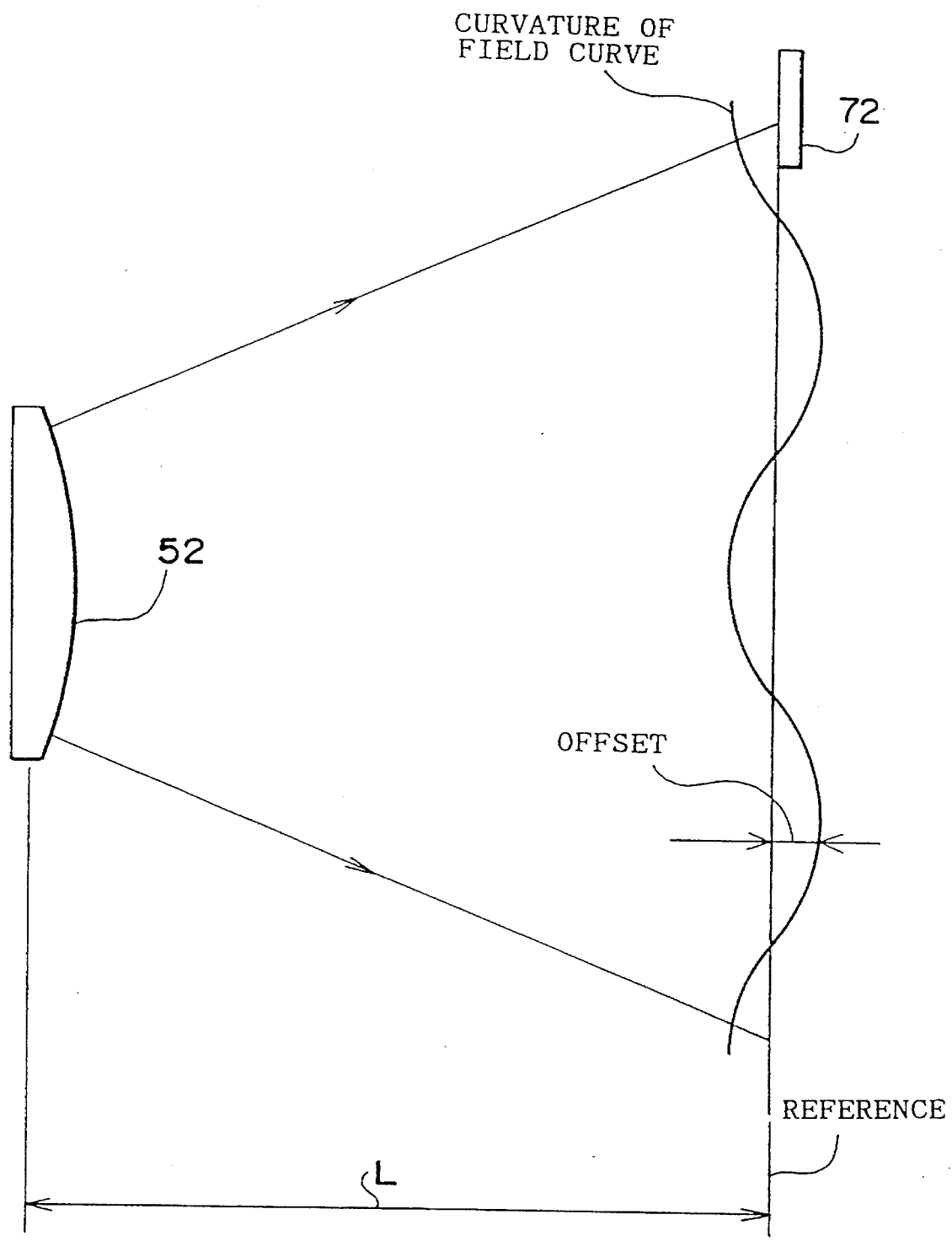
FIG. 14 is a conceptual view illustrating an amount of curvature of field stored in a storing device.
Figure 15:
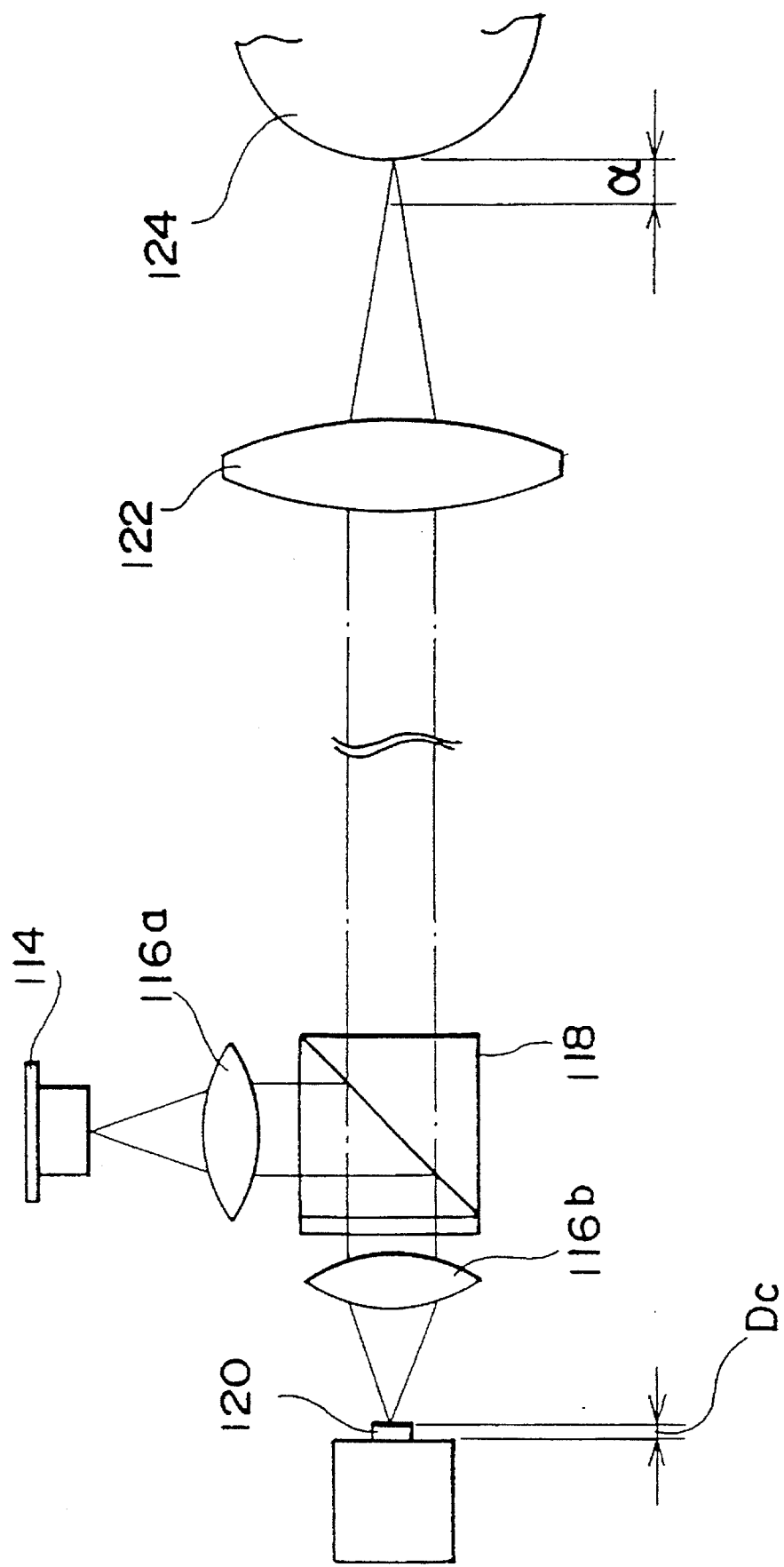
FIG. 15 is a conceptual view for explaining a process for determining variation of an optical path for correcting curvature of field.

The table of the curve, which is illustrated in FIG. 14, of the curvature of field at the reference position is stored in the storing device 170. Accordingly, a value corresponding to the amount of deformation of the piezo-electric element 92 can be determined which allows scanning of the laser beam on the photosensitive drum 54 while the beam diameter of the laser beam is held at a minimum with respect to all directions of deflection by reflecting the amount of offset From the reference value, which is in the table and corresponds to the position sensor 72, by the value determined by the above-described maximum/minimum calculating process.

Accordingly, the focal position control circuit 162 refers to the table and controls the piezo-electric element 92 based on the signal outputted from the position sensor 72. As a result, the curvature of Field of the laser beam imaged by the f·θ lens 52 can be corrected. Further, the position of the image surface can be corrected so as to coincide with the recording surface of the photosensitive material and the image can be scanned and recorded without the position of the image surface deviating from the recording surface of the photosensitive material.

The beam waist position of the laser beam which is incident on the f·θ lens 52 is varied by the changing of the optical path due to the deformation of the piezo-electric element 92. The curvature of field due to the fθ lens 52 is eliminated by varying the beam waist position. Therefore, the laser beam is always imaged on the recording surface of the photosensitive material from one end in the scanning direction to the other end. Accordingly, a high-quality image can be obtained without defects such as lack of clarity of portions of the image recorded on the photosensitive material.

Next, a fifth embodiment of the present invention will be described. In the fifth embodiment, the focal point positions of the laser beam illuminated onto the photosensitive drum are changed separately with respect to laser beams of directions orthogonal to the optical axis (i.e., the sagittal and meridional directions). As the structure of the fifth embodiment is substantially identical to that of the fourth embodiment, only portions which differ are described.

Figure 16:
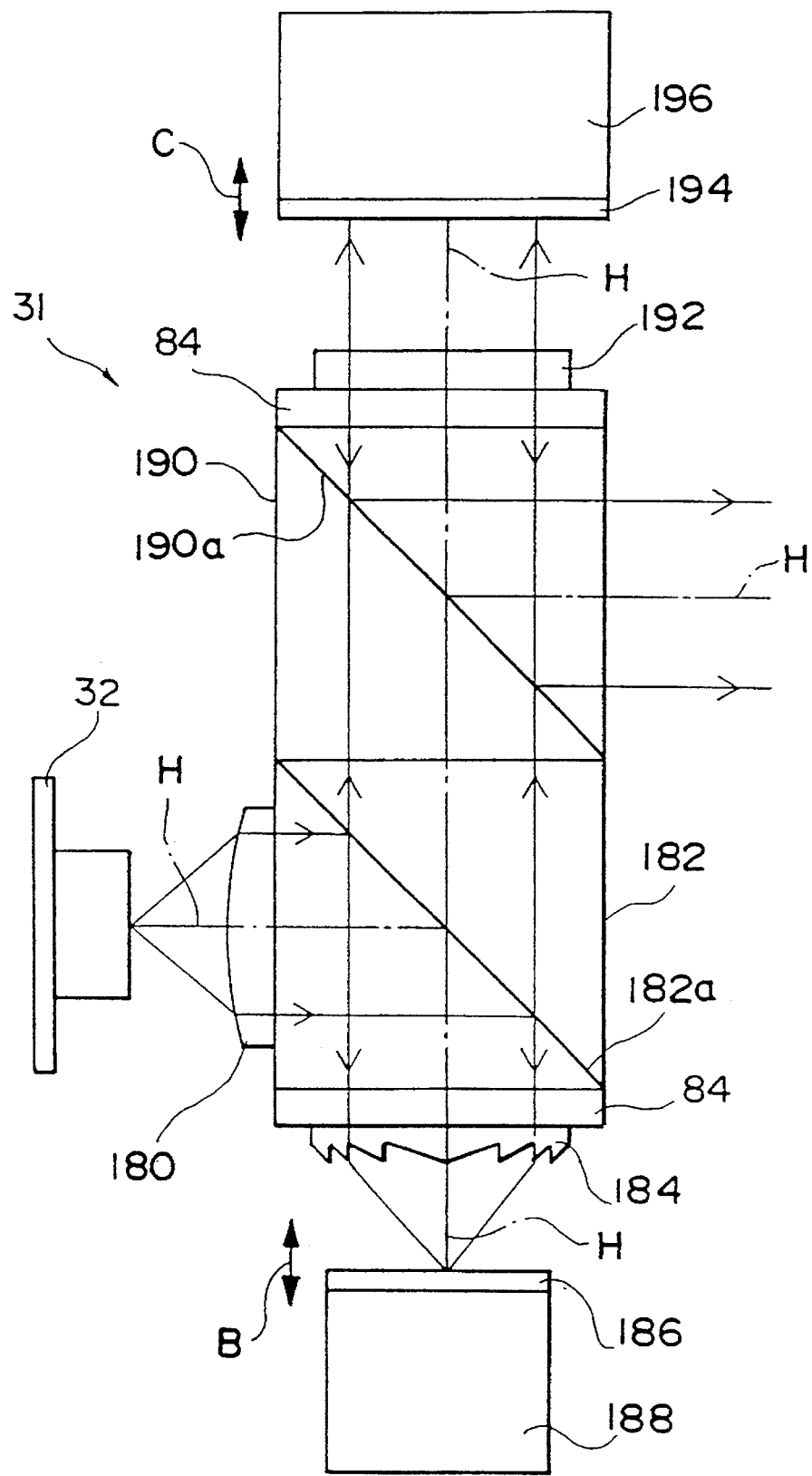
FIG. 16 is a plan view illustrating a schematic structure of a laser beam irradiating apparatus relating to a fifth embodiment.

As illustrated in FIG. 16, the laser beam irradiating device 31 of the fifth embodiment includes the semiconductor laser 32. A collimator lens 180 is disposed at the irradiating side of the semiconductor laser 32. A first polarization beam splitter 182 is disposed at the laser beam exiting side of the collimator lens 180. The collimator lens 180 is attached to a surface of the first polarization beam splitter 182. The laser beam which exits the collimator lens 180 is reflected by a reflecting surface 182a of the first polarization beam splitter 182 and is transmitted through the quarter-wave plate 84 which is attached to a surface of the first polarization beam splitter 182. The laser beam is transmitted through and exits from a first cylindrical lens 184, which is attached to a surface of the quarter-wave plate 84. A first piezo-electric element 188 is disposed at the exiting side of the first cylindrical lens 184. A reflecting layer 186 is deposited on a surface of the first piezo-electric element 188.

The laser beam which exits from the quarter-wave plate 84 is converged in one of the sagittal and meridional directions at the first cylindrical lens 184 and is reflected by the reflecting layer 186 so that the optical path is changed 180°. The laser beam reflected by the reflecting layer 186 is again transmitted through the first cylindrical lens 184 and the quarter-wave plate 84, and is incident on the first polarization beam splitter 182. The polarizing angle of the laser beam which is incident on the first polarization beam splitter 182 is rotated 90° by the laser beam being transmitted twice through the quarter-wave plate 84. Therefore, the laser beam is transmitted through and exits from the reflecting surface 182a. The laser beam which is transmitted through the reflecting surface 182a is incident on a second polarization beam splitter 190 which is attached to the first polarization beam splitter 182.

The respective polarizing angles of the first and second polarization beam splitters 182, 190 are equal. The laser beam which is transmitted through the reflecting surface 182a is also transmitted through a reflecting surface 190a of the second polarization beam splitter 190. The laser beam which is transmitted through the reflecting surface 190a is transmitted through a quarter-wave plate 84, which is attached to a surface of the second polarization beam splitter 190, and through a second cylindrical lens 192, which is attached to a surface of the quarter-wave plate 84, and exits from the second cylindrical lens 192. A second piezo-electric element 196 is disposed at the exiting side of the second cylindrical lens 192. A reflecting layer 194 is deposited on a surface of the second piezo-electric element 196.

The laser beam which is transmitted through the reflecting surface 190a is converged by the second cylindrical lens 192 in a direction orthogonal to the direction in which the laser beam was converged by the first cylindrical lens 184. The laser beam is reflected by the reflecting layer 194 so that the optical path thereof is changed 180°. The laser beam which is reflected by the reflecting layer 194 is again transmitted through the second cylindrical lens 192 and the quarter-wave plate 84, and is incident on the second polarization beam splitter 190. The polarizing angle of the laser beam, which is incident on the second polarization beam splitter 190, is rotated 90° in a similar manner as that described above. Therefore, the laser beam is reflected by the reflecting surface 190a so that the optical path thereof is deflected 90°, and the laser beam exits the second polarization beam splitter 190. The laser beam which is reflected by the reflecting surface 190a is incident on the polygon mirror 46 (see FIG. 13).

Next, operation of the fifth embodiment will be described. The laser beam is irradiated from the semiconductor laser 32, is reflected by the reflecting layer 186, and is transmitted through the first polarization beam splitter 182. The laser beam is then reflected by the reflecting layer 194 and is reflected by the second polarization beam splitter 190. Thereafter, the laser beam is deflected by the polygon mirror 46 and scans the light-receiving surface of the position sensor 72 and the recording surface of the photosensitive material. The curvature of field of the laser beam imaged by the f·θ lens 52 may differ according to the direction on the plane which intersects the optical axis. For example, the semiconductor laser 32 generally has an astigmatism. The respective exiting angles of the laser beam in the direction along the junction surface and in the direction orthogonal to the junction surface are different. As a result, the focal point (beam waist) positions change when the laser beam is collimated at the same power, i.e., when collimated by a spherical lens having rotational symmetry. Accordingly, when the light collimated by the spherical lens is focussed by the f·θ lens, the curvature of field of the imaged laser beam differs in accordance with the directions (i.e., the sagittal and meridional directions) which intersect the optical axis and the respective angles of the directions.

In the fifth embodiment, respective focal position adjustments of the laser beam in the sagittal direction and the meridional direction, which are orthogonal to the optical axis, are effected separately. Namely, the focal position control device 162 is connected to the piezo-electric elements 188,196 and applies the same or different voltages to the piezo-electric elements 188, 196 so that the magnitude of the fluctuation of the level of the signal outputted from the position sensor 72 becomes a maximum.

At the predetermined original positions of the reflecting layers 186, 194, the respective laser beams reflected by the reflecting layers 186, 194 are incident on and exit from the first polarization beam splitter 182 and the second polarization beam splitter 190, respectively, as parallel bundles of rays (i.e., at the beam width) illustrated by the solid lines in FIG. 16. In this case, the respective piezo-electric elements 188, 196 are operated in the following manner.

When voltage is applied to the piezo-electric element 188, the piezo-electric element 188 is displaced along the directions of approaching and moving away from the first polarization beam splitter 182 (i.e., in the directions of arrow B in FIG. 16) in accordance with the magnitude of the applied voltage. Due to this displacement, the reflecting layer 186 also moves along the direction of arrow B in FIG. 16.

Figure 17:
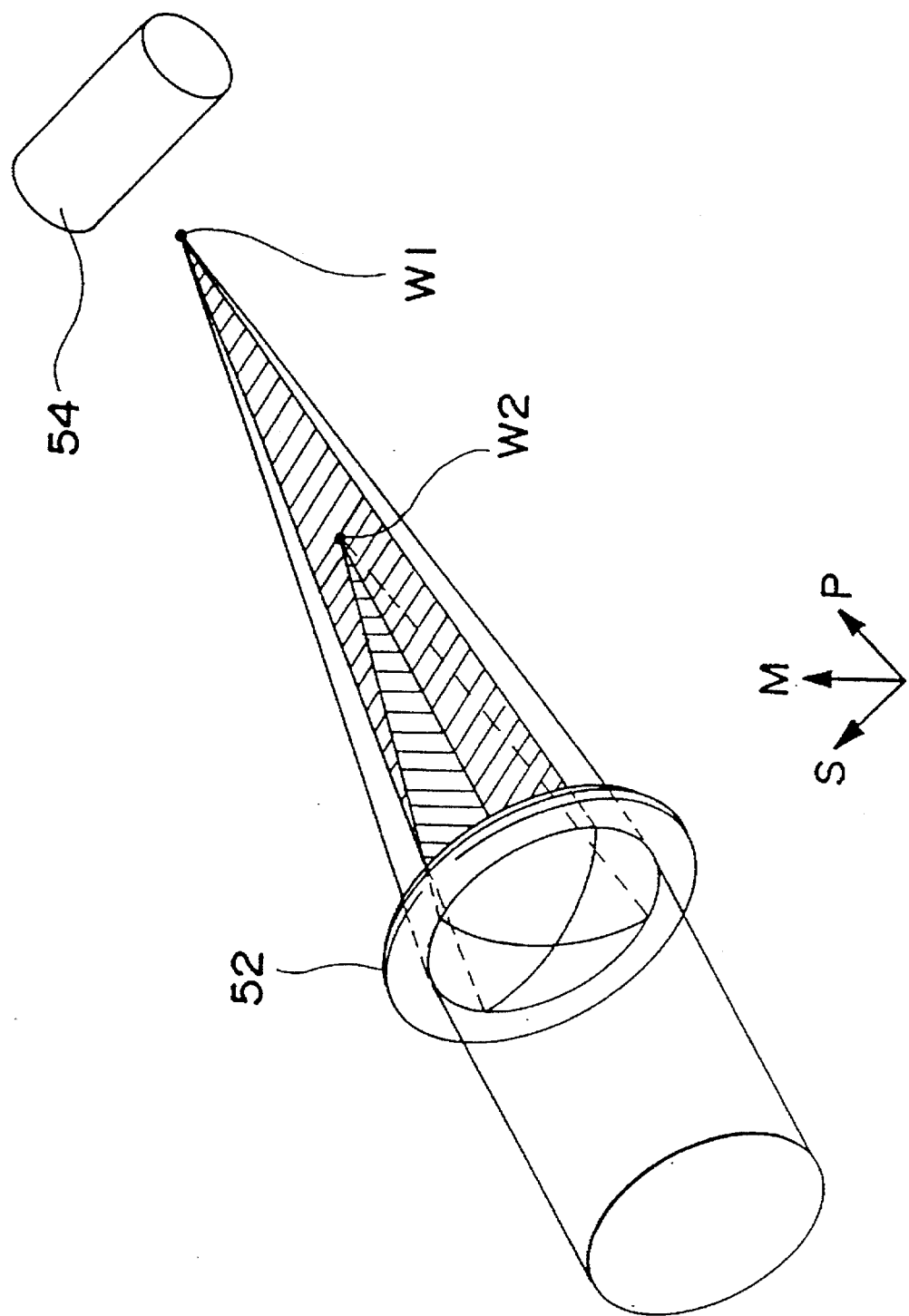
FIG. 17 is a conceptual view for explaining a converged state of a laser beam at the laser beam irradiating apparatus of the fifth embodiment.
Figure 18:
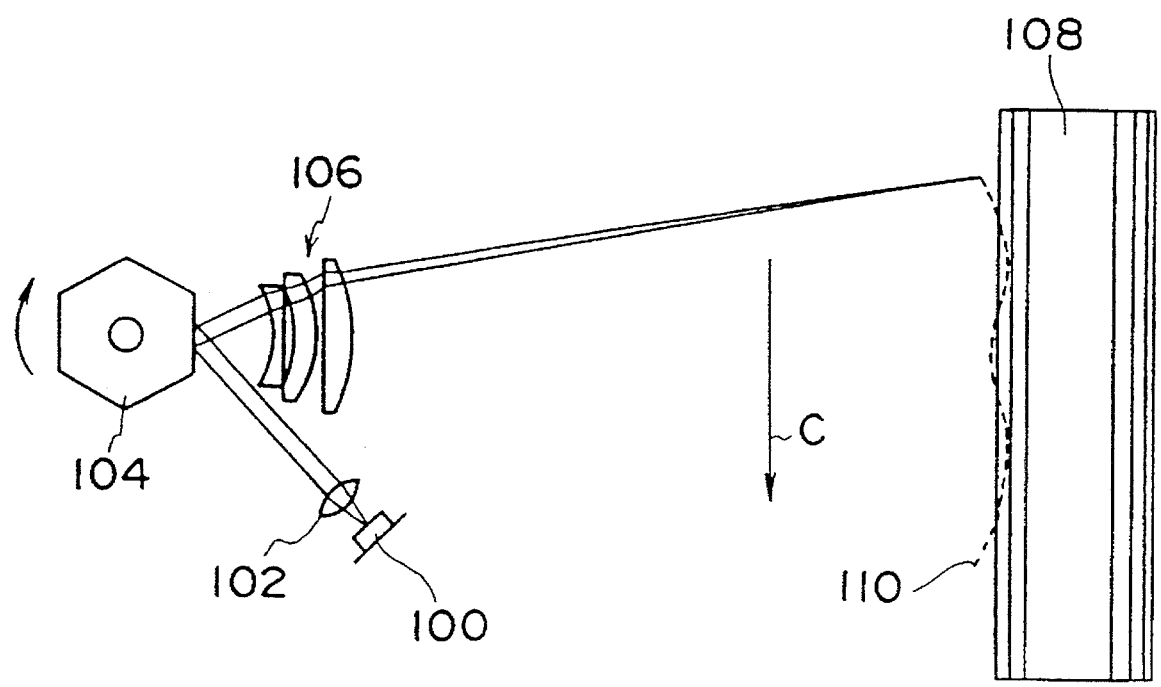
FIG. 18 is an explanatory view explaining a schematic structure of a conventional laser beam recording device and curvature of field.

When the reflecting layer 186 is moved to a position near the first polarization beam splitter 182, only the optical path of the laser beam of the converging direction (i.e., the horizontal direction in FIG. 16 along the optical path H) of the first cylindrical lens 184 is shortened. The beam width of the laser beam reflected by the reflecting layer 186 is slightly wider than that when the reflecting layer 186 is positioned at the original position. The laser beam exits from the first polarization beam splitter 182. Accordingly, as illustrated in FIG. 17, a beam waist position W1 of the laser beam imaged by the f·θ lens 52 is moved close to the photosensitive drum 54.

Further, when the reflecting layer 186 is moved to a position away from the first polarization beam splitter 182, the optical path of the laser beam becomes longer. The beam width of the laser beam reflected by the reflecting layer 186 is slightly more narrow than that when the reflecting layer 186 is positioned at the original position. The laser beam exits from the first polarization beam splitter 182. Accordingly, the beam waist position of the laser beam imaged by the f·θ lens 52 is moved away from the photosensitive drum 54 (i.e., along the direction of the half-arrow P in FIG. 17).

Similarly, when voltage is applied to the piezo-electric element 196, the piezo-electric element 196 is displaced along the directions of approaching and moving away from the second polarization beam splitter 190 (i.e., in the directions of arrow C in FIG. 16) in accordance with the magnitude of the applied voltage. Due to this displacement, the reflecting layer 194 is also moved along the directions of arrow C in FIG. 16.

When the reflecting layer 194 is moved to a position away from the second polarization beam splitter 190, only the optical path of the laser beam of the converging direction (i.e., the vertical direction in FIG. 16 along the optical path H) of the second cylindrical lens 192 is lengthened. The beam width of the laser beam reflected by the reflecting layer 194 is slightly narrower than that when the reflecting layer 194 is positioned at the original position. The laser beam exits from the second polarization beam splitter 194. Accordingly, as illustrated in FIG. 17, a beam waist position W2 of the laser beam imaged by the f·θ lens 52 is moved away from the photosensitive drum 54.

Further, when the reflecting layer 194 is moved to a position close to the second polarization beam splitter 190, the optical path of the laser beam becomes shorter. The beam width of the laser beam reflected by the reflecting layer 194 is slightly wider than that when the reflecting layer 194 is positioned at the original position. The laser beam exits from the second polarization beam splitter 190. Accordingly, the beam waist position of the laser beam imaged by the f·θ lens 52 is moved close to the photosensitive drum 54 (i.e., along the direction of the half-arrow P in FIG. 17).

Accordingly, the positions of the image surface in directions of planes intersecting the optical axis are different. When the position of the image surface in each plane deviates from the recording surface of the photosensitive material, the deviation is detected as a decrease in the magnitude of the fluctuation of the level of the signal outputted from the position sensor 72. Therefore, the focal position control device 162 varies the voltages to be applied to the respective piezo-electric elements 188, 196 so that the magnitude of the fluctuation of the level of the signal output from the position sensor 72 is a maximum. The respective positions of the reflecting layers 186, 194 are moved in accordance with the voltages. As a result, the position of the image surface is corrected so as to correspond with the recording surface of the photosensitive material, and a high quality image can be recorded regardless of the fluctuations in the surrounding environment.

In the fifth embodiment, the reflecting layers are formed on the piezo-electric elements in order to change the optical path. Therefore, work involved in attaching the reflecting mirrors to the piezo-electric elements and driving the reflecting mirrors can be eliminated. It suffices to effect control so that the piezo-electric element is driven as a unit. Driving can thereby be effected stably and reliably.

Further, in the fifth embodiment, the collimator lens, the quarter-wave plate and the cylindrical lens are attached to the polarization beam splitter. High power lenses having thin centers, such as a grating lens, a Fresnel lens or the like, can be used as a lens to be attached to the polarization beam splitter. Large-scale production and installation of such lenses are easy. Accordingly, even if, as in the fifth embodiment, a device is provided to independently adjust the respective deviations of the focal point positions generated by curvatures of field of respective laser beams of intersecting directions, the device can be structured simply.

A distributed index lens, for example a SELFOC lens (trade name) or a GRIN lens, can be used as the cylindrical lens. The distributed index lens is plate shaped and has lens power. The thickness of the lens is constant, and the lens can therefore be easily attached in the same way as the quarter-wave plate. Accordingly, large-scale production and installation are facilitated even more.

In the present invention, the piezo-electric elements are controlled based on a signal obtained from the image sensor which is disposed on the same plane as the photosensitive drum. However, a signal outputted from the linear encoder may be used so that there is no need to provide the position sensor. Alternatively, it suffices to effect correction control of the curvature of field on a plane which includes a preset focal position, without using the sensor.

In the above embodiments, examples are described in which the laser beam irradiated from the semiconductor laser is used as the light beam. However, the present invention is not limited to the same. A laser beam irradiated from a laser device such as a gas laser, a fixed laser, a pigment laser or the like may be used. Alternatively, a light beam irradiated from a light-generating element of an LED or the like may be used.

What is claimed is:

1. A light beam recording device comprising:

light beam irradiating means for irradiating a light beam;

a scanning optical system which scans said light beam onto a recording medium to be recorded, which is provided in a vicinity of a focal position, while focussing said light beam;

converging means disposed on an optical path between said light beam irradiating means and said scanning optical system, and converging a light beam incident on said converging means; and optical path changing means disposed in a vicinity of a converging position of a light beam converged by said converging means, and changing an optical path of a converged light beam;

wherein said optical path changing means has an optical axis direction moving member, said optical axis direction moving member having a reflecting surface provided so as to be movable in directions of an optical axis of said path changing means.

2. A light beam recording device according to claim 1, wherein said optical path changing means has control means, said control means controlling said optical axis direction moving member such that a focal position of a light beam, which is illuminated from said scanning optical system in a direction of said object to be illuminated, coincides with a position of said object to be illuminated.

3. A light beam recording device according to claim 1, wherein said optical axis direction moving member is a piezo-electric element in which said reflecting surface is formed by a deposited surface.

4. A light beam recording device according to claim 3, wherein said scanning optical system provides magnification in a scanning direction.

* * * * *